(12) United States Patent
Kubo et al.

(10) Patent No.: US 9,720,146 B2
(45) Date of Patent: Aug. 1, 2017

(54) DISPLAY MEMBER, TRANSFER FOIL, AND ARTICLE WITH DISPLAY MEMBER

(71) Applicant: TOPPAN PRINTING CO., LTD., Toyko (JP)

(72) Inventors: Akira Kubo, Toyko (JP); Chikara Sawamura, Tokyo (JP); Kazuhiro Yashiki, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 124 days.

(21) Appl. No.: 14/287,807

(22) Filed: May 27, 2014

(65) Prior Publication Data
US 2014/0268261 A1 Sep. 18, 2014

Related U.S. Application Data

(63) Continuation of application No. PCT/JP2012/081561, filed on Dec. 5, 2012.

(30) Foreign Application Priority Data

Dec. 7, 2011 (JP) .................................. 2011-268137
Jan. 16, 2012 (JP) .................................. 2012-006134

(51) Int. Cl.
*G03H 1/00* (2006.01)
*G02B 5/18* (2006.01)
(Continued)

(52) U.S. Cl.
CPC ............... *G02B 5/18* (2013.01); *B42D 25/00* (2014.10); *B42D 25/30* (2014.10); *G03H 1/0011* (2013.01);
(Continued)

(58) Field of Classification Search
CPC ........ G09F 19/12; G09F 19/14; G09F 3/0294; B42D 25/30; B42D 25/00; B42D 2035/20;
(Continued)

(56) References Cited

U.S. PATENT DOCUMENTS 7,907,339 B2 * 3/2011 Tompkin .............. B42D 25/324
359/2
8,498,034 B2 * 7/2013 Tompkin .............. G03H 1/0011
359/15
(Continued)

FOREIGN PATENT DOCUMENTS

JP    8-211821    8/1996
JP    2524092     1/1997
(Continued)

OTHER PUBLICATIONS

PCT International Preliminary Report on Patentability mailed Jun. 19, 2014 in corresponding International Patent Application No. PCT/JP2012/081561.
(Continued)

*Primary Examiner* — Scott J Sugarman
*Assistant Examiner* — Mustak Choudhury

(57) ABSTRACT

A display member according to this invention includes a plurality of pixels. At least one of the plurality of pixels includes a relief structure formation layer including a first region configured to display a predetermined color on a condition, and a second region different from the first region, a first layer made of a first material, and covering at least the first region, and a second layer made of a second material different from the first material, and covering the first layer. The display member displays an image based on a distribution of the first region on the condition that the display member is observed in the oblique direction, and displays an image based on a distribution of the second region on a (Continued)

condition that the display member is observed with transmitted light.

19 Claims, 16 Drawing Sheets

(51) Int. Cl.
  *G09F 19/12* (2006.01)
  *G09F 19/14* (2006.01)
  *G09F 3/00* (2006.01)
  *B42D 25/00* (2014.01)
  *B42D 25/30* (2014.01)

(52) U.S. Cl.
  CPC ............ *G09F 3/0294* (2013.01); *G09F 19/12* (2013.01); *G09F 19/14* (2013.01); *B42D 2033/24* (2013.01); *B42D 2035/20* (2013.01)

(58) Field of Classification Search
  CPC .... B42D 2033/24; B42D 25/29; B42D 25/41; B42D 25/324; B42D 25/373; G03H 1/0011; G03H 1/0244; G03H 1/0248; G03H 1/041; G03H 1/28; G03H 1/01; B29D 11/0073; G02B 27/0905; G02B 27/0961; G02B 3/0056
  USPC ........ 359/1, 2, 15, 20, 22–25, 32, 33, 204.5, 359/207.7, 558, 566, 569–576; 283/72, 283/85, 86; 427/162; 428/141, 172
  See application file for complete search history.

(56) References Cited

U.S. PATENT DOCUMENTS

| | | | |
|---|---|---|---|
| 8,514,492 B2* | 8/2013 | Schilling | B29D 11/00278 359/618 |
| 2012/0064303 A1 | 3/2012 | Yashiki et al. | |

FOREIGN PATENT DOCUMENTS

| | | |
|---|---|---|
| JP | 2007-118563 | 5/2007 |
| JP | 2008-107472 | 5/2008 |
| JP | 4194073 | 12/2008 |
| JP | 2009-63703 | 3/2009 |
| JP | 2009-86648 | 4/2009 |
| JP | 2010-38940 | 2/2010 |
| JP | 2010-280079 | 12/2010 |
| JP | 2011-218648 | 11/2011 |
| WO | WO 2010/147185 A1 | 12/2010 |
| WO | WO 2011/065160 A1 | 6/2011 |

OTHER PUBLICATIONS

International Search Report mailed Jan. 15, 2013 in corresponding International Patent Application No. PCT/JP2012/081561.
Extended European Search Report dated May 29, 2015 in corresponding European Patent Application No. 12856375.6.

* cited by examiner

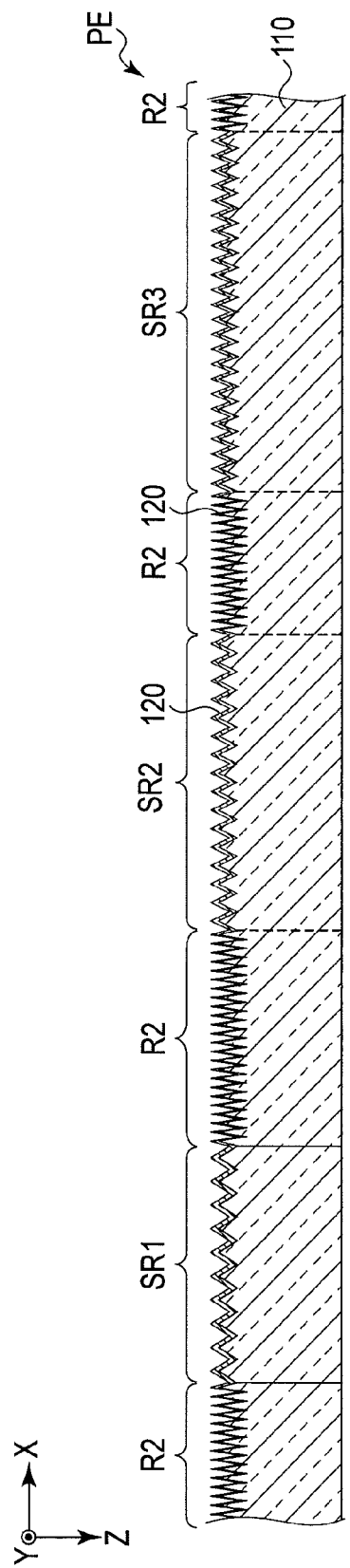
F I G. 6

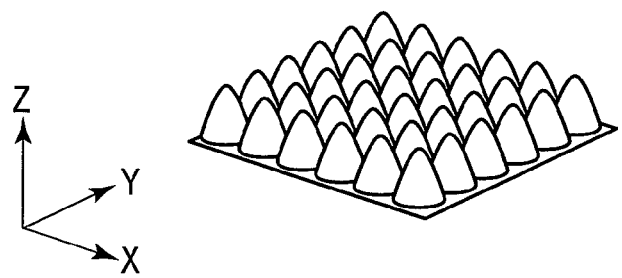
F I G. 9
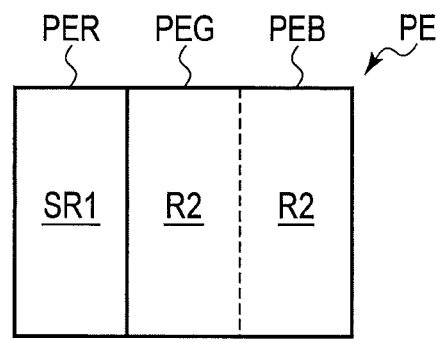
F I G. 10
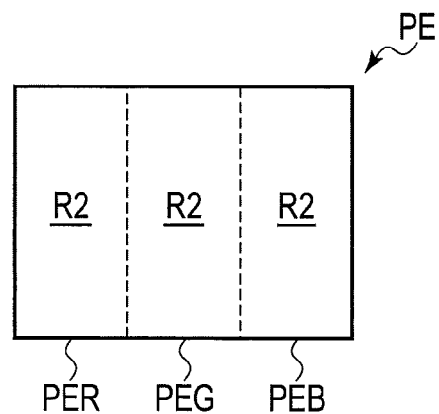
F I G. 11

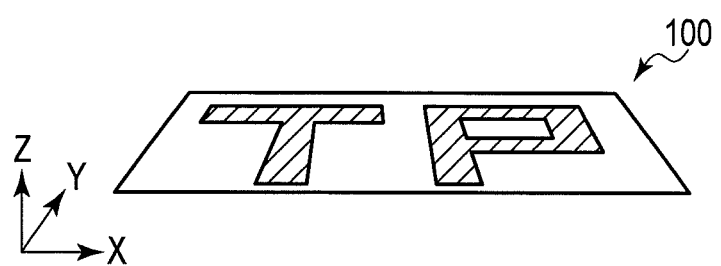
F I G. 12

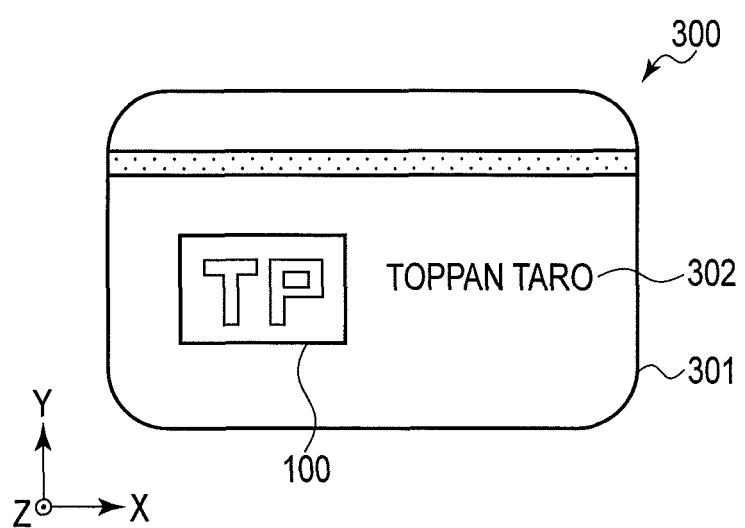
F I G. 14

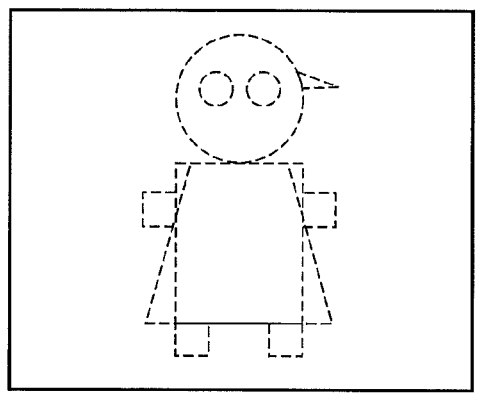
F I G. 25
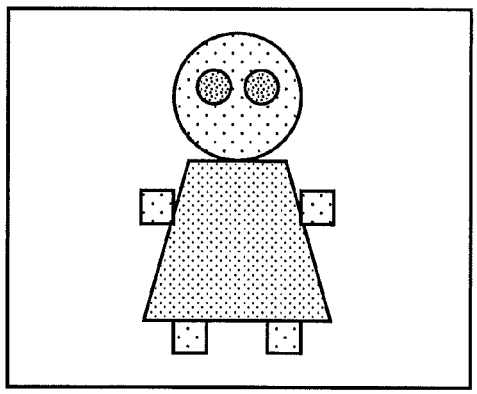
F I G. 26
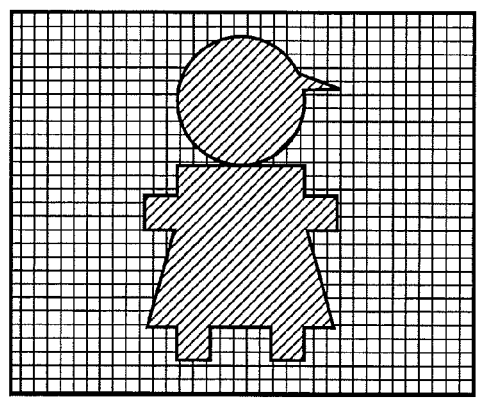
F I G. 27

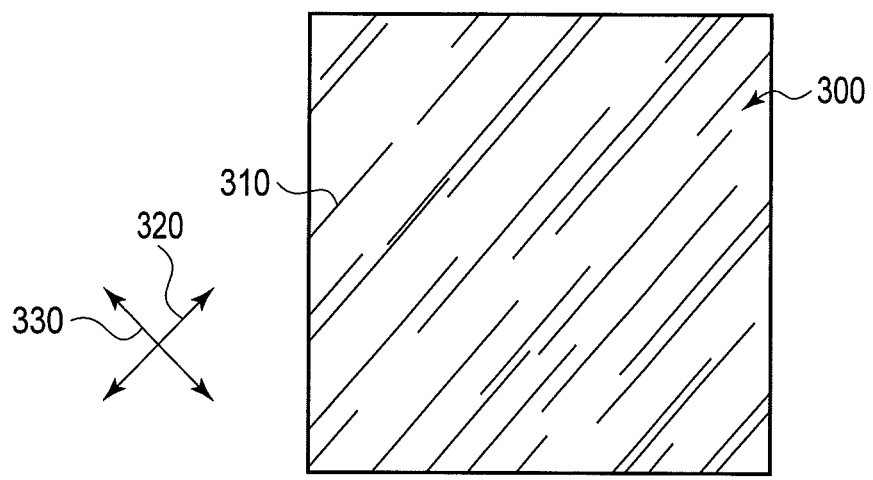
F I G. 28

DISPLAY MEMBER, TRANSFER FOIL, AND ARTICLE WITH DISPLAY MEMBER

CROSS-REFERENCE TO RELATED APPLICATIONS

This is a Continuation application of PCT application No. PCT/JP2012/081561, filed on Dec. 5, 2012, which was published under PCT Article 21(2) in Japanese.

This application is based upon and claims the benefit of priority from Japanese Patent Applications No. 2011-268137, filed on Dec. 7, 2011, and No. 2012-006134, filed on Jan. 16, 2012, the entire contents of all of which are incorporated herein by reference.

BACKGROUND OF THE INVENTION

The present invention relates to an optical technique for providing a forgery preventing effect, decorative effect, and/or aesthetic effect.

Articles such as securities, certificates, brand items, electronic apparatuses, and personal authentication media are desirably difficult to forge. Therefore, articles like these are sometimes made to support display members having a high forgery preventing effect.

Many such display members include microstructures such as diffraction gratings, holograms, and lens arrays. These microstructures change colors in accordance with, e.g., changes in observation angle. Also, these microstructures are difficult to analyze and forge. Accordingly, display members like these can achieve a relatively high forgery preventing effect.

Note that as a technique pertaining to a display member as described above, there is a technique by which a pixel is divided into three portions as RGB channels, and a photograph-quality color image is expressed by a diffraction structure by area coverage modulation in these channels.

CITATION LIST

Patent Literature

Patent Literature 1: Jpn. Pat. Appln. KOKAI Publication No. 8-211821

Presently, however, the forgery preventing effect of the above-mentioned display members is decreasing because hologram formation techniques have spread.

BRIEF SUMMARY OF THE INVENTION

It is, therefore, an object of the present invention to achieve a higher forgery preventing effect.

According to the first aspect of the present invention, there is provided a display member including a plurality of pixels, at least one of the plurality of pixels including a relief structure formation layer including a first region formed by a plurality of recesses or projections and including at least one sub region configured to display a predetermined color on a condition that the sub region is observed in an oblique direction intersecting a normal of a major surface of the display member, and a second region different from the first region, a first layer which is made of a first material having a refractive index different from that of a material of the relief structure formation layer, and covers at least the first region, and in which a portion corresponding to the first region has a surface shape corresponding to a surface shape of the first region, and a ratio of an amount of the first material in a position of the second region to an apparent area of the second region is zero or lower than a ratio of an amount of the first material in a position of the first region to an apparent area of the first region, and a second layer which is made of a second material different from the first material, and covers the first layer, and in which a ratio of an amount of the second material in the position of the second region to the apparent area of the second region is zero or lower than a ratio of an amount of the second material in the position of the first region to the apparent area of the first region, wherein the display member displays an image based on a distribution of the first region on the condition that the display member is observed in the oblique direction, and displays an image based on a distribution of the second region on a condition that the display member is observed with transmitted light.

According to the second aspect of the present invention, there is provided a transfer foil including the display member according to the first aspect, and a support layer supporting the display member such that the display member is peelable.

According to the third aspect of the present invention, there is provided an article with a display member, including the display member according to the first aspect, and an article supporting the display member.

The present invention can achieve a high forgery preventing effect.

BRIEF DESCRIPTION OF THE SEVERAL VIEWS OF THE DRAWINGS

FIG. 6 is a sectional view schematically showing the method of manufacturing the display member 100.

FIG. 9 is a perspective view showing, in an enlarged scale, an example of a structure adoptable as a plurality of recesses or projections formed in a second region R2 shown in FIGS. 3 and 4.

FIG. 10 is a plan view showing another example of the pixel forming the display member shown in FIGS. 1 and 2.

FIG. 11 is a plan view showing another example of the pixel forming the display member shown in FIGS. 1 and 2.

FIG. 12 is a perspective view showing a state in which the display member shown in FIGS. 1 and 2 is obliquely observed.

FIG. 14 is a plan view schematically showing an article with a display member according to the embodiment.

FIG. 25 is a schematic view showing an example of the display member according to the embodiment.

FIG. 26 is a schematic view showing an example of the display member according to the embodiment.

FIG. 27 is a schematic view showing an example of the display member according to the embodiment.

FIG. 28 is a plan view schematically showing an example of a light-scattering region.

DETAILED DESCRIPTION OF THE INVENTION

Figure 1:
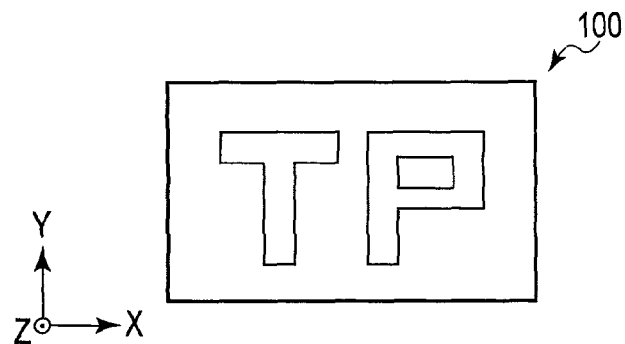
FIG. 1 is a plan view schematically showing a display member according to the first embodiment of the present invention.

Embodiments of the present invention will be explained in detail below with reference to the accompanying drawings. Note that in these drawings, the same reference numerals denote constituent elements that achieve the same or similar functions, and a repetitive explanation will be omitted.

First Embodiment

Figure 2:
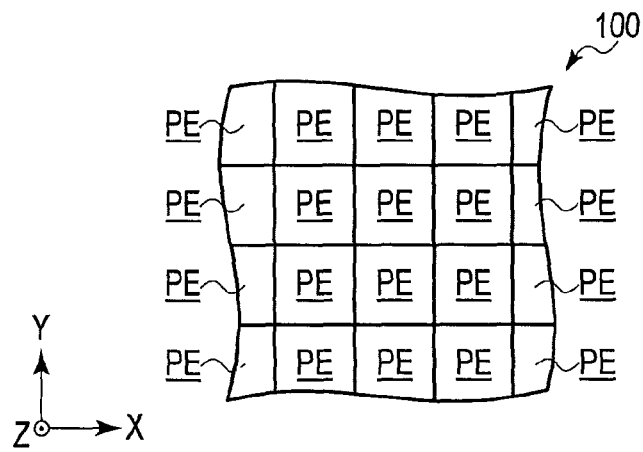
FIG. 2 is a plan view showing, in an enlarged scale, a part of the display member shown in FIG. 1.

First, the first embodiment of the present invention will be explained. FIG. 1 is a plan view schematically showing a display member according to this embodiment. FIG. 2 is a plan view showing, in an enlarged scale, a part of the display member shown in FIG. 1. Referring to FIGS. 1 and 2, axes parallel to the major surface of a display member 100 and perpendicular to each other are an X-axis and Y-axis, and an axis perpendicular to the major surface of the display member 100 is a Z-axis.

The display member 100 shown in FIG. 1 includes a plurality of pixels PE as shown in FIG. 2. In the example shown in FIG. 2, the pixels PE are arranged into the form of a rectangular matrix along the X-axis and Y-axis.

Figure 3:
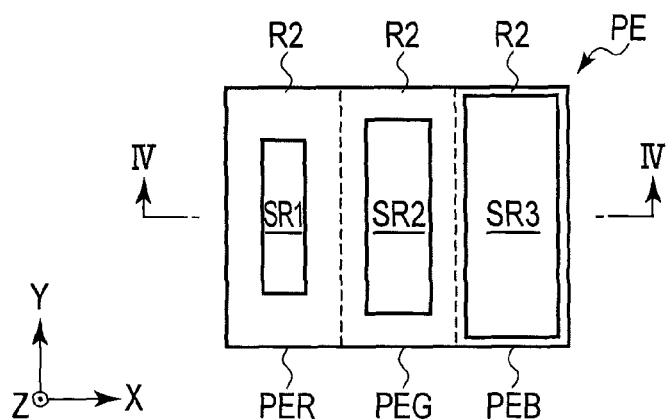
FIG. 3 is a plan view showing an example of a pixel forming the display member shown in FIGS. 1 and 2.
Figure 4:
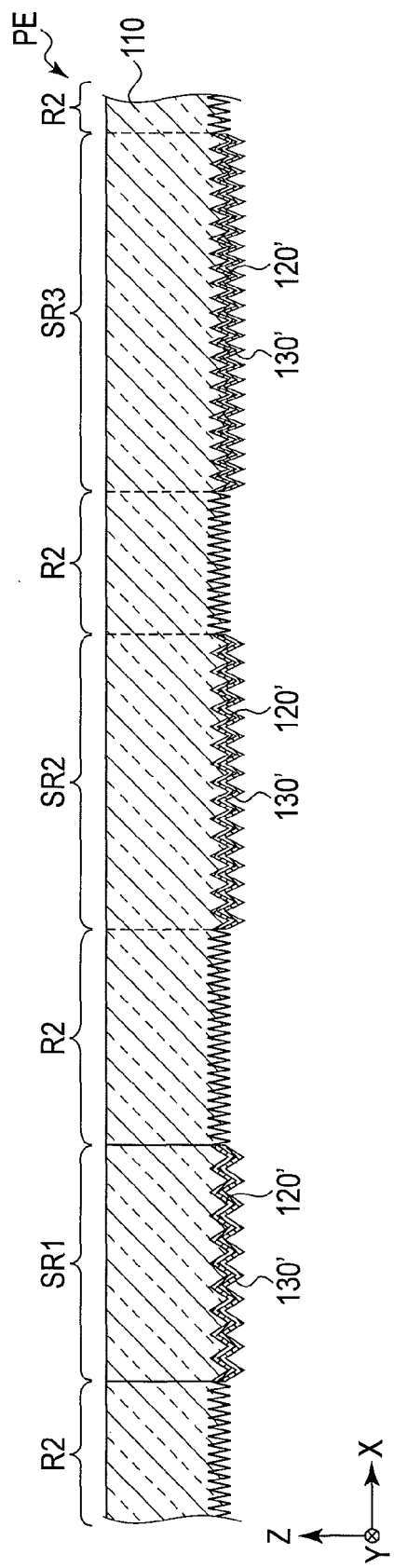
FIG. 4 is a sectional view taken along a line IV-IV of the pixel shown in FIG. 3.

FIG. 3 is a plan view showing an example of the pixel forming the display member shown in FIGS. 1 and 2. FIG. 4 is a sectional view taken along a line IV-IV of the pixel shown in FIG. 3.

As shown in FIG. 3, the pixel PE includes a red display pixel PER, green display pixel PEG, and blue display pixel PEB. The pixels PER, PEG, and PEB typically have the same area.

The red display pixel PER includes a first sub region SR1 and second region R2. Note that the first sub region SR1 is so formed as to display red on a condition that the region is observed in an oblique direction intersecting the normal of the major surface of the display member 100 (this condition will simply be referred to as an oblique observation condition hereinafter). That is, the first sub region SR1 includes a plurality of recesses or projections so formed as to emit diffracted light having a wavelength corresponding to red under the oblique observation condition.

The green display pixel PEG includes a second sub region SR2 and second region R2. Note that the second sub region SR2 is so formed as to display green under the oblique observation condition. That is, the second sub region SR2 includes a plurality of recesses or projections so formed as to emit diffracted light having a wavelength corresponding to green under the oblique observation condition.

The blue display pixel PEB includes a third sub region SR3 and second region R2. Note that the third sub region SR3 is so formed as to display blue under the oblique observation condition. That is, the third sub region SR3 includes a plurality of recesses or projections so formed as to emit diffracted light having a wavelength corresponding to blue under the oblique observation condition.

Note that in the following explanation, regions including the first, second, and third sub regions SR1, SR2, and SR3 will be referred to as first regions for convenience.

As shown in FIG. 4, the pixel PE includes a relief structure formation layer 110, first layer 120', and second layer 130'.

A relief structure is formed on one major surface of the relief structure formation layer 110. The first layer 120' partially covers this major surface of the relief structure formation layer 110. The second layer 130' covers the first layer 120'. Note that the structure and the like of the pixel PE will be explained in detail later.

Next, a method of manufacturing (the pixel PE forming) the display member 100 will be explained with reference to FIGS. 5, 6, 7, and 8.

Figure 5:
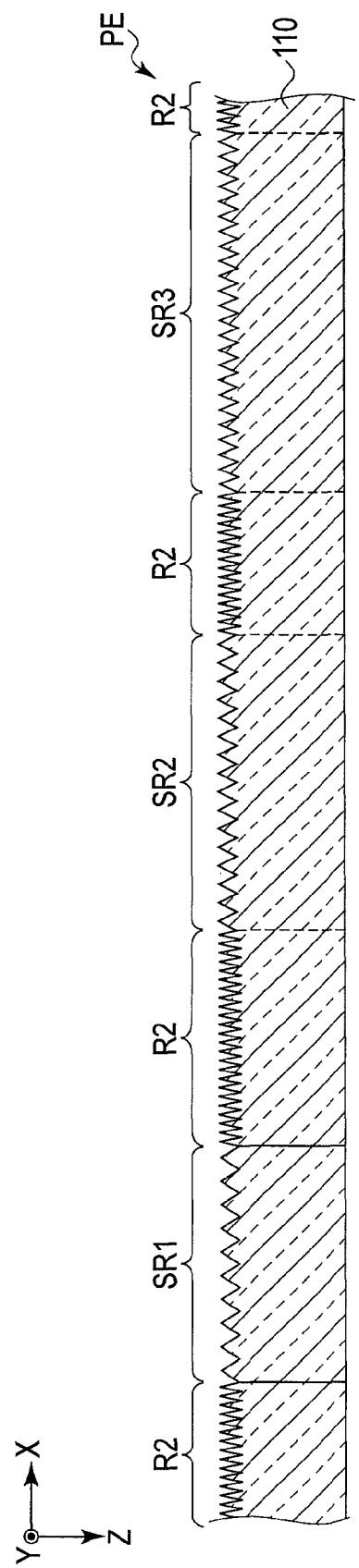
FIG. 5 is a sectional view schematically showing a method of manufacturing a display member 100.

FIGS. 5, 6, 7, and 8 are sectional views schematically showing the method of manufacturing the display member 100. First, as shown in FIG. 5, a relief structure formation layer 110 having a major surface including first regions (first, second, and third sub regions SR1, SR2, and SR3) and second regions R2 adjacent to each other is prepared.

A recessed structure and/or projecting structure is formed in each of the first, second, and third sub regions SR1, SR2, and SR3. The recessed structure includes a plurality of recesses, and the projecting structure includes a plurality of projections. These recesses or projections are arranged into, e.g., stripes. These recesses or projections typically form a diffraction grating or hologram that emits diffracted light when illuminated with white light.

The shape of a section perpendicular to the longitudinal direction of the plurality of recesses or projections is a tapered shape such as a V-shape or U-shape, or a rectangular shape. As an example, FIG. 5 shows a V-shape as the above-mentioned sectional shape.

The center-to-center distance of the plurality of recesses or projections formed in the first sub region SR1 is 860 to 880 nm. The center-to-center distance of the plurality of recesses or projections formed in the second sub region SR2 is 755 to 775 nm. The center-to-center distance of the plurality of recesses or projections formed in the third sub region SR3 is 735 to 755 nm.

Also, the average value of the ratios of the depths or heights to the center-to-center distance of the plurality of recesses or projections is, e.g., 0.5 or less, and is typically 0.05 to 0.3.

Note that the "center-to-center distance" herein mentioned means the distance between adjacent recesses or the distance between adjacent projections.

The recessed structure and/or projecting structure is formed in the second regions R2. The recessed structure includes a plurality of recesses, and the projecting structure includes a plurality of projections. The plurality of recesses or projections include a plurality of two-dimensionally arranged recesses or projections each having a forward tapered shape.

The ratio of the surface area to the apparent area in the second regions R2 is higher than that in first regions R1. Note that the "apparent area" of a region means the area of the orthographic projection of the region to a plane parallel to the region, i.e., the area of the region when a recessed structure and projecting structure are ignored. Also, the "surface area" of a region means the area of the region when a recessed structure and projecting structure are taken into consideration.

The average value of the ratios of the depths or heights to the center-to-center distance of the plurality of recesses or projections in the second regions R2 is typically larger than that of the plurality of recesses or projections in the first regions. In the example shown in FIG. 5, the ratio of the depth or height to the center-to-center distance of the plurality of recesses or projections formed in the second regions R2 is higher than those of the plurality of recesses or projections formed in the first, second, and third sub regions SR1, SR2, and SR3.

The center-to-center distance of the recesses or projections formed in the second regions R2 is 100 to 500 nm.

Also, the average value of the ratios of the depths or heights to the center-to-center distance of the plurality of recesses or projections formed in the second regions R2 is made larger than the average value of the ratios of the depths or heights to the center-to-center distance of the plurality of recesses or projections formed in the first regions. The average value of the ratios of the depths or heights to the center-to-center distance of the plurality of recesses or projections formed in the second regions R2 is, e.g., 0.8 to 2.0, and is typically 0.8 to 1.2. If this value is excessively large, the productivity of the relief structure formation layer 110 sometimes decreases.

The relief structure formation layer 110 can be formed by, e.g., pressing a metal mold having micro projections against a resin. In this case, these projections have shapes corresponding to the shapes of recesses to be formed in both the first region and second region R2.

For example, the relief structure formation layer 110 is formed by a method of coating a substrate with a thermoplastic resin, and pressing an original plate having the above-mentioned projections against the resin while applying heat. In this method, for example, an acrylic-based resin, an epoxy-based resin, a cellulose-based resin, a vinyl-based resin, or a mixture or copolymer thereof is used as the above-mentioned thermoplastic resin.

The relief structure formation layer 110 may also be formed by a method of coating a substrate with a thermosetting resin, applying heat while pressing an original plate having the above-mentioned projections against the resin, and removing the original plate after that. In this method, for example, a urethane resin, a melamine-based resin, an epoxy resin, a phenol-based resin, or a mixture or copolymer thereof is used as the thermosetting resin. Note that the urethane resin is obtained by, e.g., adding polyisocyanate as a crosslinking agent to, e.g., acryl polyol and polyester polyol having a reactive hydroxyl group, and crosslinking the acryl polyol and polyester polyol.

Alternatively, the relief structure formation layer 110 may be formed by a method of coating a substrate with a radiation-curing resin, curing the material by irradiating it with radiation such as ultraviolet rays while pressing an original plate against the material, and removing the original plate after that. It is also possible to form the relief structure formation layer 110 by a method of supplying the above-mentioned composition between a substrate and original plate, curing the above-mentioned material by irradiating it with radiation, and removing the original plate after that.

The radiation-curing resin typically contains a polymerizable compound and initiator.

As the polymerizable compound, for example, a compound capable of radical photopolymerization is used. As the compound capable of radical photopolymerization, for example, a monomer, oligomer, or polymer having an ethylenic unsaturated bond or ethylenic unsaturated group is used. As the compound capable of radical photopolymerization, it is also possible to use, e.g., monomers such as 1,6-hexanediol, neopentyl glycol diacrylate, trimethylol propane triacrylate, pentaerythritol triacrylate, pentaerythritol tetraacrylate, pentaerythritol pentaacrylate, and dipentaerythritol hexaacrylate, oligomers such as epoxy acrylate, urethane acrylate, and polyester acrylate, or polymers such as urethane-modified acrylic resin and epoxy-modified acrylic resin.

When using the compound capable of radical photopolymerization as the polymerizable compound, a radical photopolymerization initiator is used as the initiator. As this radical photopolymerization initiator, for example, benzoin-based compounds such as benzoin, benzoinmethylether, and benzomethylether, anthraquinone-based compounds such as anthraquinone and methyl anthraquinone, phenyl ketone-based compounds such as acetophenone, diethoxy acetophenone, benzophenone, hydroxy acetophenone, 1-hydroxy cyclohexyl phenyl ketone, α-amino acetophenone, and 2-methyl-1-(4-methylthiophenyl)-2-morpholinopropane-1-on, benzyl dimethyl ketal, thioxanthone, acylphosphine oxide, or Michler's ketone are used.

Alternatively, a compound capable of cationic photopolymerization may be used as the polymerizable compound. As the compound capable of cationic photopolymerization, for example, a monomer, oligomer, or polymer including an epoxy group, a compound containing an oxetane skeleton, or vinyl ethers are used.

When using the compound capable of cationic photopolymerization as the polymerizable compound, a cationic photopolymerization initiator is used as the initiator. As this cationic photopolymerization initiator, for example, an aromatic diazonium salt, aromatic iodonium salt, aromatic sulfonium salt, aromatic phosphonium salt, or mixed ligand metal salt is used.

Alternatively, a mixture of the compound capable of radical photopolymerization and the compound capable of cationic photopolymerization may also be used as the polymerizable compound. In this case, for example, a mixture of the radical photopolymerization initiator and cationic photopolymerization initiator is used as the initiator. It is also possible to use a polymerization initiator capable of functioning as an initiator for both radical photopolymerization and cationic photopolymerization. As an initiator like this, for example, an aromatic iodonium salt or aromatic sulfonium salt is used.

Note that the ratio of the initiator in the radiation-curing resin is, e.g., 0.1 to 15 mass %.

The radiation-curing resin may further contain a sensitizing dye, a dyestuff, a pigment, a polymerization inhibitor, a leveling agent, an antifoaming agent, an antisagging agent, an adhesion increasing agent, a coated surface modifier, a plasticizer, a nitrogen-containing compound, a crosslinking agent such as an epoxy resin, a release agent, or a combination thereof. To improve the formability of the radiation-curing resin, the resin can further contain a nonreactive resin. As this nonreactive resin, it is possible to use, e.g., the above-mentioned thermoplastic resin and/or thermosetting resin.

The above-mentioned original plate used in the formation of the relief structure formation layer 110 can be manufactured by using, e.g., an electron beam lithography apparatus or nanoimprinting apparatus. In this case, the plurality of recesses or projections described above can be formed with high accuracy. Note that a general approach is to manufacture an inverted plate by transferring the recess-and-projection structure of the original plate, and manufacture a duplicated plate by transferring the recess-and-projection structure of this inverted plate. If necessary, an inverted plate is manufactured by using the duplicated plate as an original plate, and a duplicated plate is further manufactured by transferring the recess-and-projection structure of this inverted plate. In the actual manufacture, the duplicated plate thus obtained is normally used.

The relief structure formation layer 110 typically includes a substrate and a resin layer formed on it. A film substrate is typically used as the substrate. As this film substrate, plastic films such as a polyethyleneterephthalate (PET) film, polyethylenenaphthalate (PEN) film, and polypropyrene (PP) film are used. It is also possible to use paper, synthetic paper, plastic multilayered paper, or resin-impregnated paper as the substrate. Note that the substrate may also be omitted.

The resin layer is formed by, e.g., the above-described method. The thickness of the resin layer is, e.g., 0.1 to 10 µm. If this thickness is excessively large, resin protrusion and/or wrinkle formation readily occurs due to, e.g., pressurization during processing. If this thickness is excessively small, the desired recessed structure and/or projecting structure becomes difficult to form in some cases. Also, the thickness of the resin layer is made equal to or larger than the depth of height of recesses or projections to be formed on the major surface of the layer. This thickness is, e.g., 1 to 10 times, and typically, 3 to 5 times the depth or height of the recesses or projections.

Note that the relief structure formation layer 110 may also be formed by using, e.g., a "press method" disclosed in Japanese Patent No. 4194073, a "casting method" disclosed in Japanese Utility Model Registration No. 2524092, or a "photopolymer method" disclosed in Jpn. Pat. Appln. KOKAI Publication No. 2007-118563.

Then, as shown in FIG. 6, a first material having a refractive index different from that of the material of the relief structure formation layer 110 is formed by vapor-phase deposition all over the first regions and second regions R2. Consequently, a reflective material layer 120 is formed on the major surface including the first, second, and third sub regions SR1, SR2, and SR3 and the second regions R2 of the relief structure formation layer 110.

As the first material, for example, a material having a refractive index difference of 0.2 or more from that of the material of the relief structure formation layer 110 is used. If this difference is small, reflection sometimes hardly occurs in the interface between the relief structure formation layer 110 and a first layer 120' (to be described later). Also, a metal material can be used.

As the first material, at least one metal material selected from the group consisting of Al, Sn, Cr, Ni, Cu, Au, Ag, and alloys thereof is typically used.

Alternatively, as the first material having a relatively high transparency, ceramic materials or organic polymer materials to be enumerated below may also be used. Note that a numerical value in the parentheses described after each formula or compound name below means the refractive index of the material.

That is, as the ceramic material, it is possible to use, e.g., $Sb_2O_3$ (3.0), $Fe_2O_3$ (2.7), $TiO_2$ (2.6), CdS (2.6), $CeO_2$ (2.3), ZnS (2.3), $PbCl_2$ (2.3), CdO (2.2), $Sb_2O_3$ (5), $WO_3$ (5), SiO (5), $Si_2O_3$ (2.5), $In_2O_3$ (2.0), PbO (2.6), $Ta_2O_3$ (2.4), ZnO (2.1), $ZrO_2$ (5), MgO (1), $SiO_2$ (1.45), $Si_2O_2$ (10), $MgF_2$ (4), $CeF_3$ (1), $CaF_2$ (1.3 to 1.4), $AlF_3$ (1), $Al_2O_3$ (1), or GaO (2).

As the organic polymer material, it is possible to use, e.g., polyethylene (1.51), polypropyrene (1.49), polytetrafluoroethylene (1.35), polymethylmethacrylate (1.49), or polystyrene (1.60).

The vapor-phase deposition of the first material is performed by using, e.g., vacuum vapor deposition, sputtering, or chemical vapor deposition (CVD).

This vapor-phase deposition is performed at a uniform density in an in-plane direction parallel to the major surface of the relief structure formation layer 110. More specifically, this vapor-phase deposition is performed such that the ratio of the amount of first material in the positions of the first regions (the first, second, and third sub regions SR1, SR2, and SR3) to the apparent area of the first regions is equal to the ratio of the amount of first material in the positions of the second regions R2 to the apparent area of the second regions R2.

Also, in this vapor-phase deposition, a film thickness (to be referred to as a set film thickness hereinafter) when it is assumed that the major surface of the relief structure formation layer 110 is entirely a flat surface is typically determined as follows. That is, this set film thickness is determined so that the reflective material layer 120 satisfies the following necessary conditions.

First, those portions of the reflective material layer 120, which correspond to the first regions, have surface shapes corresponding to the surface shapes of the first regions. In the example shown in FIG. 6, these portions form a continuous film having surface shapes corresponding to the plurality of recesses or projections formed in the first, second, and third sub regions SR1, SR2, and SR3.

Second, those portions of the reflective material layer 120, which correspond to the second regions R2, have a surface shape corresponding to the surface shape of the second regions R2, or partially have openings corresponding to the arrangement of the plurality of recesses or projections formed in the second regions R2. FIG. 6 shows the former case as an example. That is, in the example shown in FIG. 6, these portions form a continuous film having a surface shape corresponding to the plurality of recesses or projections formed in the second regions R2.

Note that as described previously, the ratio of the surface area to the apparent area in the second regions R2 is higher than that in the first regions. Therefore, when the above-mentioned set film thickness is determined so that the reflective material layer 120 has the surface shapes corresponding to the surface shapes of the first, second, and third sub regions SR1, SR2, and SR3 and the second regions R2, those portions of the reflective material layer 120, which correspond to the second regions R2, have an average film thickness smaller than that of the portions corresponding to the first, second, and third sub regions SR1, SR2, and SR3.

Note that the "average film thickness" of a layer means the average value of the distances between points on one surface of the layer and the foot of a line perpendicular to the other surface of the layer.

Also, when the above-mentioned set film thickness is determined as a smaller value, it is possible to form the reflective material layer 120 having the surface shapes corresponding to the surface shapes of the first regions in the portions corresponding to the first regions, and partially having the openings corresponding to the arrangement of the plurality of recesses or projections in the portions corresponding to the second regions R2.

The set film thickness of the reflective material layer 120 is typically made smaller than the depth or height of the plurality of recesses or projections formed in the second regions R2. Also, this set film thickness is typically made smaller than the depth or height of the plurality of recesses or projections formed in the first regions (the first, second, and third sub regions SR1, SR2, and SR3).

More specifically, the set film thickness of the reflective material layer 120 is, e.g., 5 to 500 nm, and is typically 30 to 300 nm. If this set film thickness is excessively small, reflection sometimes hardly occurs in the interface between the relief structure formation layer 110 and a first layer 120' (to be described later). If this set film thickness is excessively large, it sometimes becomes difficult to form the reflective material layer 120 so as to satisfy the above-mentioned necessary conditions.

The average film thickness of those portions of the reflective material layer 120, which correspond to the first regions, is, e.g., 5 to 500 nm, and is typically 30 to 300 nm. If this average film thickness is excessively small, reflection sometimes hardly occurs in the interface between the relief structure formation layer 110 and a first layer 120' (to be described later). If this average film thickness is excessively large, the productivity of the display member 100 decreases in some cases.

Figure 7:
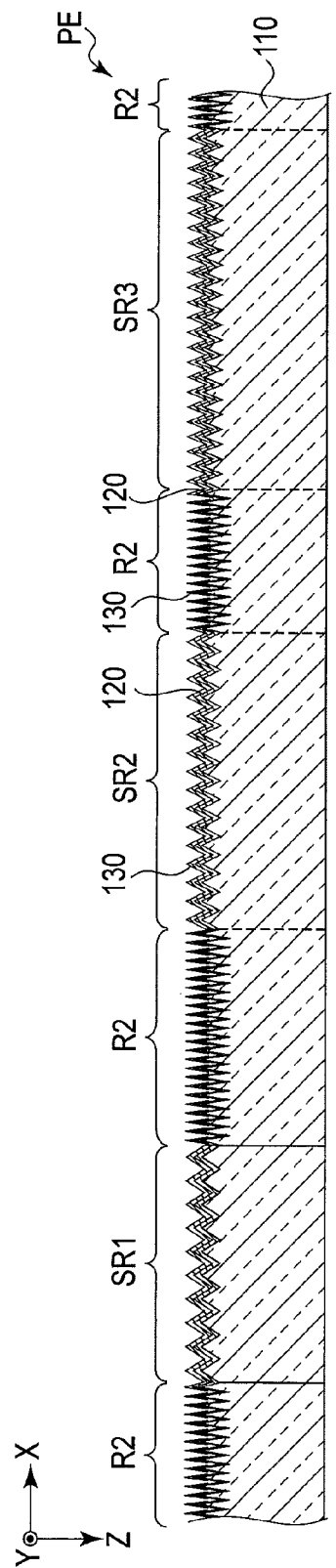
FIG. 7 is a sectional view schematically showing the method of manufacturing the display member 100.

Subsequently, as shown in FIG. 7, a second material different from the material of the reflective material layer 120 is deposited on the reflective material layer 120 in a vapor phase. Consequently, a mask layer 130 facing the relief structure formation layer 110 with the reflective material layer 120 being sandwiched between them is formed.

An inorganic material is typically used as this second material. Examples of this inorganic material are $MgF_2$, Sn, Cr, ZnS, ZnO, Ni, Cu, Au, Ag, $TiO_2$, MgO, $SiO_2$, and $Al_2O_3$. Especially when using $MgF_2$ as the second material, it is possible to further improve the followability and scratch resistance of the mask layer 130 and a second layer 130' against the bend of the substrate and a shock.

An organic material may also be used as the second material. As this organic material, for example, an organic material having a weight-average molecular weight of 1,500 or less is used. As an organic material like this, it is also possible to use, e.g., a material obtained by mixing a polymerizable compound such as acrylate, urethane acrylate, or epoxy acrylate and an initiator, depositing the mixture and a radiation-curing resin in a vapor phase, and polymerizing the material by irradiating it with radiation.

Metal alkoxide may also be used as the second material. Alternatively, it is also possible to use a material obtained by depositing metal alkoxide in a vapor phase as the second material, and polymerizing the deposited material. In this process, drying may also be performed after the vapor-phase deposition and before the polymerization.

The vapor-phase deposition of the second material is performed by using, e.g., vacuum vapor deposition, sputtering, or CVD.

This vapor-phase deposition is performed at a uniform density in an in-plane direction parallel to the major surface of the relief structure formation layer 110. More specifically, this vapor-phase deposition is performed such that the ratio of the amount of second material in the positions of the first regions (the first, second, and third sub regions SR1, SR2, and SR3) to the apparent area of the first regions is equal to the ratio of the amount of second material in the positions of the second regions R2 to the apparent area of the second regions R2.

Also, in this vapor-phase deposition, the set film thickness of the mask layer 130 is determined as follows. That is, this set film thickness is so determined that the mask layer 130 satisfies the following necessary conditions.

First, those portions of the mask layer 130, which correspond to the first regions, have surface shapes corresponding to the surface shapes of the first regions. In the example shown in FIG. 7, these portions form a continuous film having surface shapes corresponding to the plurality of recesses and projections formed in the first, second, and third sub regions SR1, SR2, and SR3.

Second, those portions of the mask layer 130, which correspond to the second regions R2, have a surface shape corresponding to the surface shape of the second regions R2, or partially have openings corresponding to the arrangement of the plurality of recesses or projections formed in the second regions R2. FIG. 7 shows the latter case as an example. That is, in the example shown in FIG. 7, these portions form, on the reflective material layer 120, a discontinuous film partially having the openings corresponding to the arrangement of the plurality of recesses or projections formed in the second regions R2.

Note that as described previously, the ratio of the surface area to the apparent area in the second regions R2 is higher than that in the first regions (the first, second, and third sub regions SR1, SR2, and SR3). Therefore, when the above-mentioned set film thickness is determined so that the mask layer 130 has the surface shapes corresponding to the surface shapes of the first, second, and third sub regions SR1, SR2, and SR3 and the second regions R2, those portions of the mask layer 130, which correspond to the second regions R2, have an average film thickness smaller than that of the portions corresponding to the first regions (the first, second, and third sub regions SR1, SR2, and SR3).

Also, when the above-mentioned set film thickness is determined as a smaller value, it is possible to form the mask layer 130 having the surface shapes corresponding to the surface shapes of the first regions in the portions corresponding to the first regions, and partially having the openings corresponding to the arrangement of the plurality of recesses or projections in the portions corresponding to the second regions R2.

The set film thickness of the mask layer 130 is typically made smaller than the depth or height of the plurality of recesses or projections formed in the second regions R2. Also, this set film thickness is typically made smaller than the depth or height of the plurality of recesses or projections formed in the first regions (the first, second, and third sub regions SR1, SR2, and SR3). In addition, the set film thickness of the mask layer 130 is typically made smaller than that of the reflective material layer 120.

More specifically, the set film thickness of the mask layer 130 is, e.g., 0.3 to 200 nm, and is typically 3 to 80 nm. If this set film thickness is excessively small, the average film thickness of those portions of the mask layer 130, which correspond to the first regions (the first, second, and third sub regions SR1, SR2, and SR3) becomes excessively small, and the protection for those portions of the reflective material layer 120, which correspond to the first regions, by the mask layer 130 sometimes becomes insufficient. If this set film thickness is excessively large, the protection for those portions of the reflective material layer 120, which correspond to the second regions R2, by the mask layer 130 sometimes becomes excessive.

The average film thickness of those portions of the mask layer 130, which correspond to the first regions (the first, second, and third regions SR1, SR2, and SR3), is typically made smaller than that of those portions of the reflective material layer 120, which correspond to the first regions.

The average film thickness of those portions of the mask layer 130, which correspond to the first regions, is, e.g., 0.3 to 200 nm, and is typically 3 to 80 nm. If this average film thickness is excessively small, the protection for those portions of the reflective material layer 120, which correspond to the first regions, by the mask layer 130 becomes insufficient, and the average film thickness of those portions of a first layer 120' (to be described later), which correspond to the first regions, sometimes becomes excessively small. If this set film thickness is excessively large, the protection for those portions of the reflective material layer 120, which correspond to the second regions R2, by the mask layer 130 sometimes becomes excessive.

Subsequently, the mask layer 130 is exposed to a reactive gas or solution capable of reacting with the material of the reflective material layer 120. This reaction with the material of the reflective material layer 120 is caused in at least the positions of the second regions R2.

In this embodiment, a case of using an etching solution capable of dissolving the material of the reflective material layer 120 as the reactive gas or solution will be explained. As this etching solution, alkaline solutions such as a sodium hydroxide solution, sodium carbonate solution, and potassium hydroxide solution are used. It is also possible to use acidic solutions such as hydrochloric acid, nitric acid, sulfuric acid, and acetic acid as the etching solution.

As shown in FIG. 7, those portions of the mask layer 130, which correspond to the first regions (the first, second, and third sub regions SR1, SR2, and SR3), form a continuous film, whereas the portions corresponding to the second regions R2 form a discontinuous film partially having openings. Those portions of the reflective material layer 120, which are uncovered with the mask layer 130, come in contact with the reactive gas or solution more easily than those portions of the reflective material layer 120, which are covered with the mask layer 130. Accordingly, the former is etched more easily than the latter.

Also, when those portions of the reflective material layer 120, which are uncovered with the mask layer 130, are removed, openings corresponding to the openings in the mask layer 130 are formed in the reflective material layer 120. When etching is further continued, the etching of the reflective material layer 120 progresses in the in-plane direction in the position of each opening. As a result, on the second regions R2, those portions of the reflective material layer 120, which support the mask layer 130, are removed together with the mask layer 130 as an upper layer.

Figure 8:
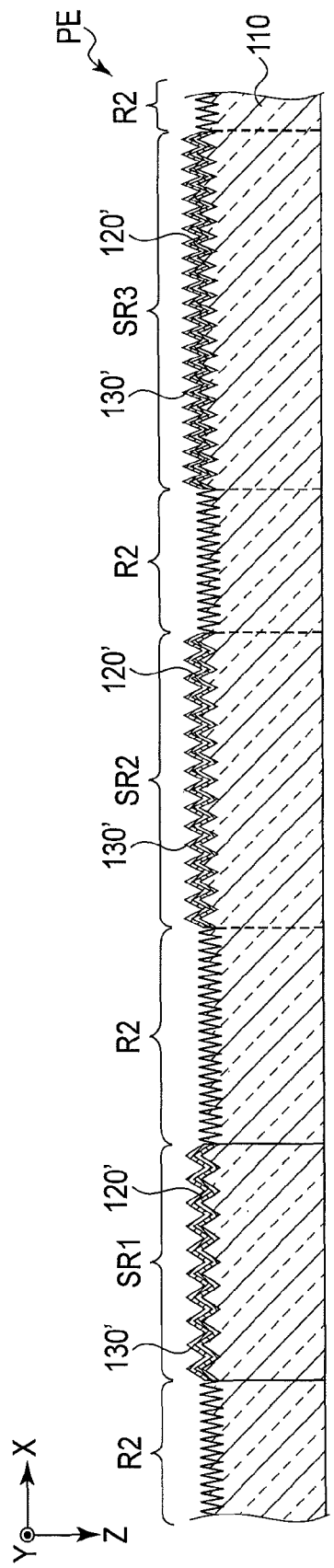
FIG. 8 is a sectional view schematically showing the method of manufacturing the display member 100.

As shown in FIG. 8, therefore, only those portions of the reflective material layer 120, which correspond to the second regions R2, can be removed by adjusting, e.g., the concentration and temperature of the etching solution and the processing time of etching. Consequently, a first layer 120' covering only the first, second, and third sub regions SR1, SR2, and SR3 is obtained.

The display member 100 including the pixels PE shown in FIGS. 3 and 4 is obtained as described above. The display member 100 obtained by the above-described method has the following features.

The first layer 120' is a reflection layer and is typically made of the first material described earlier. Of the first regions (the first, second, and third sub regions SR1, SR2, and SR3) and the second regions R2, the first layer 120' covers only the first regions. That is, the first layer 120' is formed in only positions corresponding to the first regions. Also, the ratio of the amount of first material in the positions of the second regions R2 to the apparent area of the second regions R2 is zero.

The first layer 120' has surface shapes corresponding to the surface shapes of the first regions. In the example shown in FIGS. 3 and 4, the first layer 120' has surface shapes corresponding to the plurality of recesses or projections formed in the first, second, and third sub regions SR1, SR2, and SR3. The plurality of recesses or projections formed in the first, second, and third sub regions SR1, SR2, and SR3 typically form a diffraction grating or hologram that emits diffracted light when illuminated with white light on the surface of the first layer 120'. In this case, the display member 100 can display colors corresponding to diffracted light components emitted in the first, second, and third sub regions SR1, SR2, and SR3.

More specifically, the above-mentioned first sub region SR1 is so formed as to emit diffracted light having a wavelength corresponding to red under the oblique observation condition. The second sub region SR2 is so formed as to emit diffracted light having a wavelength corresponding to green under the oblique observation condition. The third sub region SR3 is so formed as to emit diffracted light having a wavelength corresponding to blue under the oblique observation condition. That is, on the condition that the display member 100 is obliquely observed, the display member 100 according to this embodiment displays an image (full-color positive image) based on the distribution of the first, second, and third sub regions SR1, SR2, and SR3 (i.e., the first regions). In this case, therefore, it is possible to achieve a higher forgery preventing effect and higher decorative effect.

The orthographic projection of the contours of the first layer 120' to the major surface of the relief structure formation layer 110 entirely overlaps the contours of the first regions (the first, second, and third sub regions SR1, SR2, and SR3). That is, the first layer 120' is patterned in accordance with the shapes of the first regions. Accordingly, the first layer 120' formed at a high positional accuracy can be obtained by forming the first regions and second regions R2 at a high positional accuracy.

Note that in the method explained with reference to FIGS. 5, 6, 7, and 8, those portions of the reflective material layer 120, which correspond to the first regions (first, second, and third sub regions SR1, SR2, and SR3), are covered with the mask layer 130. Even when the above-mentioned etching process is performed, therefore, the film thickness of these portions hardly reduces or does not reduce at all. Accordingly, the average film thickness of those portions of the first layer 120', which correspond to the first regions, is typically equal to that of those portions of the reflective material layer 120, which correspond to the first regions. That is, this average film thickness is, e.g., 5 to 500 nm, and is typically 30 to 300 nm.

Note that the maximum value of the shortest distances between the contours of the first layer 120' and the boundaries between the first, second, and third sub regions SR1, SR2, and SR3 and the second regions R2 is, e.g., less than 20 µm, preferably less than 10 µm, and more preferably less than 3 µm.

The second layer 130' is formed by, e.g., vapor-phase deposition. The second layer 130' covers the first layer 120'. Of the first regions (the first, second, and third sub regions SR1, SR2, and SR3) and the second regions R2, the second layer 130' faces only all of the first regions with the first layer 120' being sandwiched between them. That is, the orthographic projection of the contours of the first layer 120' to the major surface of the relief structure formation layer 110 entirely overlaps the orthographic projection of the contours of the second layer 130' to the above-mentioned major surface. Also, the ratio of the amount of second material in the positions of the second regions R2 to the apparent area of the second regions R2 is zero.

The average film thickness of those portions of the second layer 130', which correspond to the first regions, is equal to or smaller than that of those portions of the mask layer 130, which correspond to the first regions. This average film thickness is, e.g., 0.3 to 200 nm, and is typically 3 to 80 nm.

The second layer 130' has, e.g., a function of protecting the first layer 120'. In addition, the formation of the second layer 130' can make the forgery of the display member 100 more difficult than when no second layer 130' exists.

In the display member 100 according to this embodiment as described above, the reflection layer is removed by etching the second regions R2 (i.e., the portions except for the diffraction elements for expressing RGB). Consequently, an image (negative image) based on the distribution of the second regions R2 is displayed on a condition that the display member 100 is observed with transmitted light.

That is, the display member 100 according to this embodiment can display a negative image when observed with transmitted light without spoiling the power of full-color expression. This makes it possible to achieve a higher forgery preventing effect.

Note that in the above explanation, the reflective material layer 120 has the surface shapes corresponding to the surface shapes of the first regions (the first, second, and third sub regions SR1, SR2, and SR3) and the second regions R2, those portions of the mask layer 130, which correspond to the first regions, have the surface shapes corresponding to the surface shapes of the first regions, and those portions of the mask layer 130, which correspond to the second regions R2, partially have the openings corresponding to the arrangement of the plurality of recesses or projections formed in the second regions R2. However, the layer arrangement is not limited to this.

For example, it is also possible to adopt an arrangement in which both the reflective material layer 120 and mask layer 130 have the surface shapes corresponding to the surface shapes of the first regions and second regions R2. In this case, as described previously, the average film thickness of those portions of each of the reflective material layer 120 and mask layer 130, which correspond to the second regions R2, is smaller than that of those portions of the layer, which correspond to the first regions.

Generally, those portions of the mask layer 130, which have a smaller average film thickness, let the reactive gas or solution permeate more easily than portions having a larger average film thickness. Also, when the reactive gas or solution reacts with the second material and the reaction product is immediately removed from the mask layer 130, openings can be formed in the mask layer 130 in only positions above the second regions R2.

Accordingly, the display member 100 shown in FIGS. 1, 2, 3, and 4 can be manufactured by adjusting, e.g., the concentration and temperature of the etching solution and the processing time of etching in this case as well.

Alternatively, it is possible to adopt an arrangement in which both the reflective material layer 120 and mask layer 130 have the surface shapes corresponding to the surface shapes of the first regions in portions corresponding to the first regions, and partially have the openings corresponding to the arrangement of the plurality of recesses and projections formed in the second regions R2 in portions corresponding to the second regions R2. The display member 100 shown in FIGS. 1, 2, 3, and 4 can be manufactured by adjusting, e.g., the concentration and temperature of the etching solution and the processing time of etching in this case as well.

Furthermore, in the above explanation, those portions of the reflective material layer 120 and mask layer 130, which correspond to the second regions R2, are completely removed. However, these portions may also partially remain. For example, the ratio of the amount of first material in the positions of the second regions R2 to the apparent area of the second regions R2 may also be made higher than zero and lower than the ratio of the amount of first material in the positions of the first regions (the first, second, and third sub regions SR1, SR2, and SR3) to the apparent area of the first regions by shortening the time of the etching process. Likewise, the ratio of the amount of second material in the positions of the second regions R2 to the apparent area of the second regions R2 may also be made higher than zero and lower than the ratio of the amount of second material in the positions of the first regions to the apparent area of the first regions.

In addition, an etching solution is used as the reactive gas or solution in the above explanation, but the reactive gas or solution is not limited to this. For example, an etching gas capable of vaporizing the material of the reflective material layer 120 may also be used as the reactive gas or solution.

Alternatively, as the reactive gas or solution, it is also possible to use a gas or solution capable of reacting with the first material and changing a portion of the reflective material layer 120 into a layer made of a material different from the first material. In this case, those portions of the reflective material layer 120, which correspond to the second regions R2, can be changed into the layer made of the material different from the first material, instead of removing these portions.

As the reactive gas or solution as described above, it is possible to use, e.g., an oxidizer capable of oxidizing the first material. As this oxidizer, it is possible to use, e.g., oxygen, ozone, halogen, halides such as chlorine dioxide, hypohalogenous acid, halogenous acid, hypohalogen acid, perhalogen acid, and salts thereof, inorganic peroxides such as hydrogen peroxide, persulfates, peroxocarbonates, peroxosulfates, and peroxophosphates, organic peroxides such as benzoyl peroxide, t-butyl hydroperoxide, cumene hydroperoxide, diisopropyl benzene hydroperoxide, performic acid, peracetic acid, and perbenzoic acid, metals or metal compounds such as cerium salt, Mn(III), Mn(IV), and Mn(VI) salts, silver salt, cuprous salt, chromium salt, cobalt salt, dichromate, chromate, permanganate, magnesium perphthalate, ferric chloride, and cupric chloride, or inorganic acids or inorganic acid salts such as nitric acid, nitrate, bromate, periodate, and iodate.

For example, when using Cu as the material of the reflective material layer 120', at least those portions of the reflective material layer 120', which correspond to the second regions R2, can be changed into a layer made of Cu oxide by causing these portions to react with the oxidizer. Alternatively, when using Al as the material of the reflective material layer 120', at least those portions of the reflective material layer 120', which correspond to the second regions R2, can be changed into a layer made of Al oxide such as boehmite by causing these portions to react with the oxidizer.

As the above-mentioned reactive gas or solution, it is also possible to use a reducing agent capable of reducing the material of the reflective material layer 120'. As this reducing agent, it is possible to use, e.g., hydrogen sulfide, sulfur dioxide, hydrogen fluoride, alcohol, carboxylic acid, hydrogen gas, hydrogen plasma, hydrogen chloride plasma, diethyl silane, ethyl silane, dimethyl silane, phenyl silane, silane, disilane, aminosilane, borane, diborane, aran, germane, hydrazine, ammonia, hydrazine, methyl hydrazine, 1,1-dimethyl hydrazine, 1,2-dimethyl hydrazine, t-butyl hydrazine, benzyl hydrazine, 2-hydrazino ethanol, 1-n-butyl-1-phenyl hydrazine, phenyl hydrazine, 1-naphthyl hydrazine, 4-chlorophenyl hydrazine, 1,1-diphenyl hydrazine, p-hydrazino benzenesulfonic acid, 1,2-diphenyl hydrazine, p-hydrazino benzenesulfonic acid, 1,2-diphenyl hydrazine, acetyl hydrazine, or benzoyl hydrazine.

Note that in the method explained with reference to FIGS. 5, 6, 7, and 8, the second layer 130' may also be removed after the first layer 120' is formed by the etching process or the like. This removal of the second layer 130' is effective when, e.g., the ionization of the first material based on the difference between the ionization tendencies of the first and second materials is concerned.

FIG. 9 is a perspective view showing, in an enlarged scale, an example of a structure adoptable as the plurality of recesses or projections formed in the second regions R2 shown in FIGS. 3 and 4.

In this example shown in FIG. 9, a plurality of two-dimensionally arranged projections each having a forward tapered shape are formed in the second regions R2.

Note that the center-to-center distance of the plurality of recesses or projections formed in the second regions R2 is 100 to 500 nm as described earlier. That is, in this embodiment, a cross grating having a large surface area is formed in the portions of the second regions R2 (i.e., the portions to be etched), and only the metal reflection layer in this cross grating portion is removed, as described previously.

Note that the display member 100 including the pixels PE explained with reference to FIG. 3 can further include a pixel PE from which some or all of the sub regions SR1 to SR3 are omitted.

FIGS. 10 and 11 are plan views showing other examples of the pixel forming the display member shown in FIGS. 1 and 2.

In the pixel PE shown in FIG. 10, the red display pixel PER includes only the first sub region SR1. Also, each of the green display pixel PEG and blue display pixel PEB includes only the second region. Therefore, the pixel PE shown in FIG. 10 contributes to the display of red under the oblique observation condition.

In the pixel PE shown in FIG. 11, each of the pixels PER, PEG, and PEB includes only the second region R2. In the pixel PE shown in FIG. 11, therefore, the metal reflection layer is removed as described previously as a whole.

When adopting the arrangements as described above, the pixel PE can be made to display an arbitrary color in accordance with the area ratios of the first, second, and third sub regions SR1, SR2, and SR3. That is, when adopting these arrangements, a full-color image can be displayed under the oblique observation condition, and a monochrome negative image can be displayed on a condition that observation is performed using transmitted light.

FIG. 12 is a perspective view showing a state in which the display member shown in FIGS. 1 and 2 is obliquely observed. As shown in FIG. 12, the display member 100 displays a full-color image under the oblique observation condition. That is, the display member 100 can display a full-color positive image when the observation condition is changed from the normal direction to the oblique direction.

Note that although not shown, on the condition that the display member 100 is observed with transmitted light, an image (monochrome negative image) corresponding to the distribution of the second regions R2 appears as described above.

As a consequence, the display member 100 according to this embodiment can achieve a higher forgery preventing effect.

Various modifications of the display member 100 are possible.

For example, FIG. 9 shows the second region R2 including the plurality of projections each having a conical shape, but the arrangement of the plurality of recesses or projections formed in the second region R2 is not limited to this.

For example, the plurality of recesses or projections formed in the second region R2 may have a quadrangular or triangular pyramidal shape. Also, the plurality of recesses or projections may have a truncated conical or pyramidal shape. Alternatively, the plurality of recesses or projections may have a structure in which a plurality of quadrangular prisms having different bottom areas are stacked in descending order of bottom area. Note that pillars such as circular cylinders or triangular prisms other than quadrangular prisms may also be stacked instead of quadrangular prisms.

Although FIG. 9 shows a structure in which the plurality of projections are arranged into the shape of a square grating, the arrangement of the plurality of recesses or projections is not limited to this. For example, the plurality of recesses or projections may also be arranged into the shape of a rectangular or triangular grating.

Furthermore, FIG. 2 shows a structure in which the plurality of pixels PE are arranged into the shape of a rectangular grating, but the arrangement of the plurality of pixels PE is not limited to this. For example, the plurality of pixels PE may also be arranged into the shape of a triangular grating.

The display member 100 explained above may also be used as a part of a self-adhesive sticker, transfer foil, or thread. Alternatively, the display member 100 may also be used as a part of a tear tape.

Figure 13:
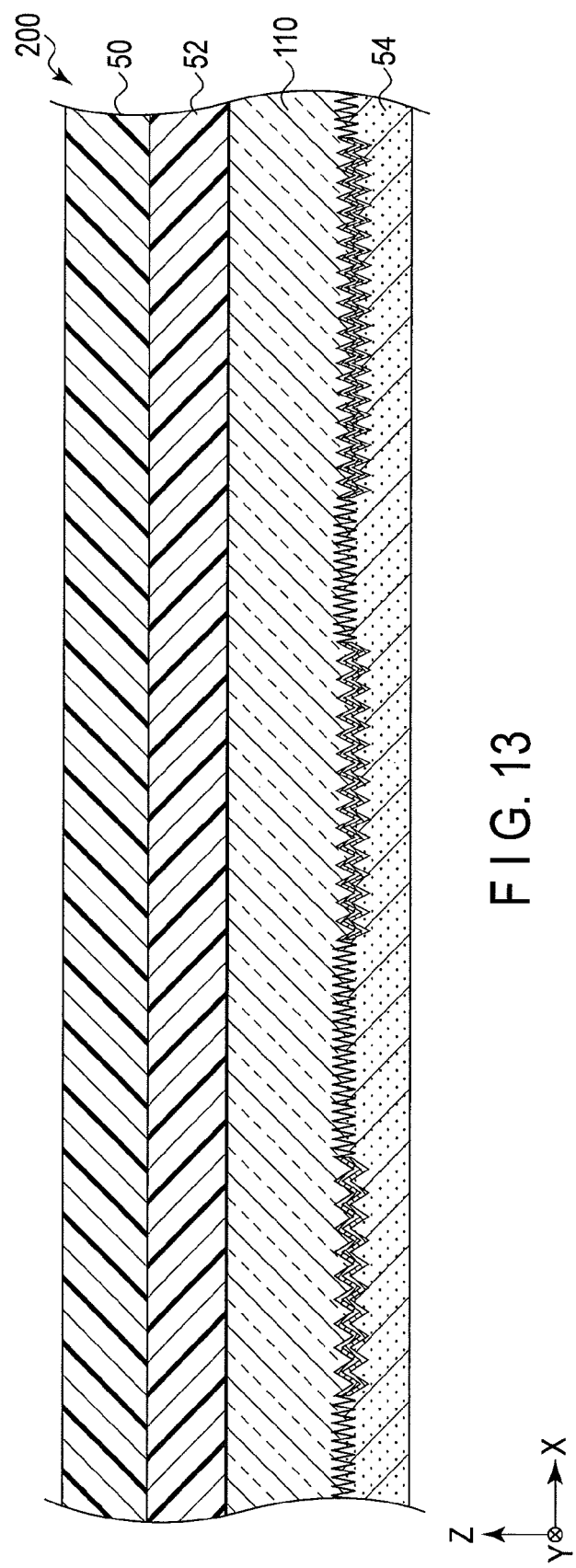
FIG. 13 is a sectional view showing a transfer foil according to the embodiment in an enlarged scale.

FIG. 13 is a sectional view showing a transfer foil according to this embodiment in an enlarged scale. A transfer foil 200 shown in FIG. 13 includes the display member 100 explained above, and a support layer 50 supporting the display member 100 such that the display member 100 is peelable. As an example, FIG. 13 shows a structure in which a release layer 52 is formed between the obverse surface of the display member 100 and the support layer 50, and an adhesive layer 54 is formed on the reverse surface of the display member 100.

The support layer 50 is, e.g., a film or sheet made of a resin. As the material of the support layer 50, for example, a polyethyleneterephthalate resin, polyethylenenaphthalate resin, polyimide resin, polyethylene resin, polypropyrene resin, or vinyl chloride resin is used.

The release layer 52 has a function of facilitating the release of the support layer 50 when transferring the transfer foil 200 to a transfer target material. An example of the material of the release layer 52 is a resin. The release layer 52 may further contain additives such as paraffin wax, carnauba wax, polyethylene wax, and silicone. Note that the thickness of the release layer 52 is, e.g., 0.5 to 5 µm.

As the material of the adhesive layer 54, adhesives such as a reaction curing type adhesive, volatile solvent type adhesive, hot-melt type adhesive, electron beam curing type adhesive, and heat-sensitive adhesive are used.

As the reaction curing type adhesive, for example, polyurethane-based resins such as polyester urethane, polyether urethane, and acryl urethane, or an epoxy resin is used.

As the volatile solvent type adhesive, aqueous emulsion type adhesives containing, e.g., a vinyl acetate resin, acrylic ester copolymer resin, ethylene-vinyl acetate copolymer resin, ionomer resin, and urethane resin, and latex type adhesives containing, e.g., natural rubber, a styrene-butadiene copolymer resin, and acrylonitrile-butadiene copolymer resin are used.

As the hot-melt type adhesive, adhesives containing, as base resins, an ethylene-vinyl acetate copolymer resin, ethylene-ethylacrylate copolymer resin, polyester resin, polycarbonate resin, polyvinylether resin, polyurethane resin, and the like are used.

As the electron beam curing type adhesive, for example, an adhesive mainly containing an oligomer having one or a plurality of vinyl-based functional groups such as an acryloyl group, allyl group, and vinyl group is used. For example, a mixture of polyesteracrylate, polyestermethacrylate, epoxyacrylate, epoxymethacrylate, urethaneacrylate, urethanemethacrylate, polyetheracrylate, or polyethermethacrylate and an adhesion promoter can be used as the electron beam curing type adhesive. As the adhesive promoter, for example, a phosphorus-containing acrylate or its derivative or a carboxy-group-containing acrylate or its derivative is used.

As the heat-sensitive adhesive, for example, a polyester resin, acrylic resin, vinyl chloride resin, polyamide resin, polyvinyl acetate resin, rubber-based resin, ethylene-vinyl acetate copolymer resin, or vinyl chloride-vinyl acetate copolymer resin is used.

The adhesive layer 54 is obtained by, e.g., coating the reverse surface of the display member 100 with the above-described resin by using coaters such as a gravure coater, micro gravure coater, and roll coater.

The transfer foil 200 is transferred to a transfer target material by using a roll transfer apparatus or hot stamp. In this process, release occurs from the release layer 52, and the display member 100 is adhered to the transfer target material via the adhesive layer 54.

FIG. 14 is a plan view schematically showing an example of an article with a display member. FIG. 14 shows a printed product 300 as an example of the article with a display member. The printed product 300 is a magnetic card and includes a substrate 301. The substrate 301 is made of, e.g., plastic.

A printed layer 302 is formed on the substrate 301. The above-described display member 100 is fixed, via an adhesive layer or the like, on the surface of the substrate 301 on which the printed layer 302 is formed. The display member 100 is prepared as, e.g., a self-adhesive sticker or transfer foil, and fixed to the substrate 301 by adhering the sticker or foil to the printed layer 302.

The printed product 300 includes the above-described display member 100. Therefore, the printed product 300 has a high forgery preventing effect. The printed product 300 further includes the printed layer 302 in addition to the display member 100. Accordingly, the optical effect of the display member 100 can be emphasized by comparing this optical effect with that of the printed layer 302.

Although FIG. 14 exemplifies a magnetic card as the printed product including the display member 100, the printed product including the display member 100 is not limited to this. For example, the printed product including the display member 100 may also be other cards such as an IC (Integrated Circuit) card, wireless card, and ID (Identification) card. Alternatively, the printed product including the display member 100 may be a security such as a gift certificate or stock certificate. Furthermore, the printed product including the display member 100 may be a tag to be attached to an article to be confirmed as an authentic product. Alternatively, the printed product including the display member 100 may be a package containing an article to be confirmed as an authentic product or a part of the package.

In the printed product 300 shown in FIG. 14, the display member 100 is adhered to the substrate 301. However, the display member 100 can be supported by the substrate by another method. For example, when using paper as the substrate, it is possible to embed the display member 100 in the paper, and form an opening in the paper in a position corresponding to the display member 10.

Note that the display member 100 according to this embodiment as explained above displays a monochrome negative image when observed with transmitted light, so a light-transmitting material is preferably used as the substrate. In this case, the display member 100 may be embedded in the material or fixed to the reverse surface of the substrate, i.e., the surface opposite to the display surface.

Also, the article with a label need not be a printed product. That is, the display member 100 may be supported by an article including no printed layer. For example, the display member 100 may be supported by a high-quality article such as a work of art.

The display member 100 may also be used for a purpose other than forgery prevention. For example, the display member 100 can also be used as a toy, learning material, or ornament.

Example

The transfer foil 200 including the pixels PE explained with reference to FIGS. 3, 10, and 11 was manufactured as follows. By use of such, an article with a display member supporting the display member 100 including the pixels PE was manufactured.

First, drawing data capable of displaying a desired image was formed under each of the oblique observation condition and a condition in which observation is performed using transmitted light. Note that drawing data in portions (i.e., the second regions R2) other than the diffraction structure for expressing RGB was formed by a cross grating of 2,000 lines/mm. A shape corresponding to the above-mentioned data was drawn on an electron beam resist by using an electron beam. Desired recesses or projections were formed by developing this resist. After that, a conductive layer was deposited in a vapor phase, conduction to the surface of each recess or projection was obtained by nickel sputtering, and a metal mold was manufactured by nickel electroforming. A plate was manufactured as described above.

Then, a relief structure formation layer 110 made of a polyethyleneterephthalate resin was coated with a release layer 52 made of an acrylic resin. The thickness of the release layer 52 was 1 µm. The release layer 52 was then coated with a layer made of a resin for molding. The thickness of this layer was 1 µm. A web was manufactured as described above.

Subsequently, the plate was pressed against the surface of the resin layer of the above-mentioned web while applying, e.g., a heat of 100° C. and a pressure of 1 MPa. Thus, a relief structure formation layer 110 including the plurality of recesses or projections on one major surface was obtained.

Note that in a portion corresponding to the first sub region SR1, the center-to-center distance of the plurality of recesses or projections was set at 870 nm. In a portion corresponding to the second sub region SR2, the center-to-center distance of the plurality of recesses or projections was set at 765 nm. In a portion corresponding to the third sub region SR3, the center-to-center distance of the plurality of recesses or projections was set at 745 nm. In portions corresponding to the second regions R2, the center-to-center distance of the plurality of recesses or projections was set at 250 nm.

Then, aluminum was deposited on the relief structure formation layer 110. A reflective material layer 120 was thus obtained. The thickness of the reflective material layer 120 was 50 nm.

Subsequently, $MgF_2$ was deposited on the reflective material layer 120. A mask layer 130 was thus obtained. The thickness of the mask layer 130 was 20 nm.

Etching was then performed by dipping the material in an NaOH (5%, 50° C.) solution, thereby obtaining a first layer 120' and second layer 130'.

After that, the aluminum-deposited surface was coated with a 2-nm thick adhesive made of an acrylic-based resin by gravure coating, thereby forming an adhesive layer 54. A transfer foil 200 was obtained as described above.

Then, the display member 100 was transferred to a transfer target material by using the transfer foil 200. A light-transmitting transfer target sheet was used as this transfer target material. Also, the transfer was performed at a temperature of 150° C. and a pressure of 10 MPa. Thus, a sheet on which the display member 100 was adhered was obtained as an article with a display member.

This sheet was obliquely observed. Consequently, it was possible to observe a photograph-quality, full-color hologram image by diffracted light components from the first, second, and third sub regions SR1, SR2, and SR3. Subsequently, this sheet was observed with transmitted light. As a consequence, it was possible to observe a monochrome negative image based on the distribution of the second regions R2.

That is, when using the display member 100, it was possible to observe the full-color hologram image under the oblique observation condition, and observe the monochrome negative image under the transmitted-light observation condition. This made it possible to achieve a higher forgery preventing effect.

Second Embodiment

Figure 15:
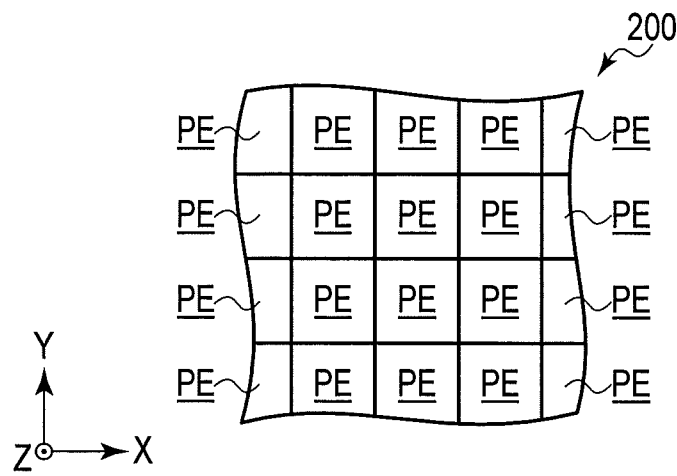
FIG. 15 is a plan view showing, in an enlarged scale, a part of a display member according to the second embodiment of the present invention.

Next, the second embodiment of the present invention will be explained. FIG. 15 is a plan view showing a part of an example of a display member according to this embodiment in an enlarged scale. Referring to FIG. 15, axes parallel to the major surface of a display member 200 and perpendicular to each other are an X-axis and Y-axis, and an axis perpendicular to the major surface of the display member 200 is a Z-axis.

The display member 200 according to this embodiment includes a plurality of pixels PE as shown in FIG. 15. In the example shown in FIG. 15, the pixels PE are arranged into the form of a rectangular matrix along the X-axis and Y-axis.

Figure 16:
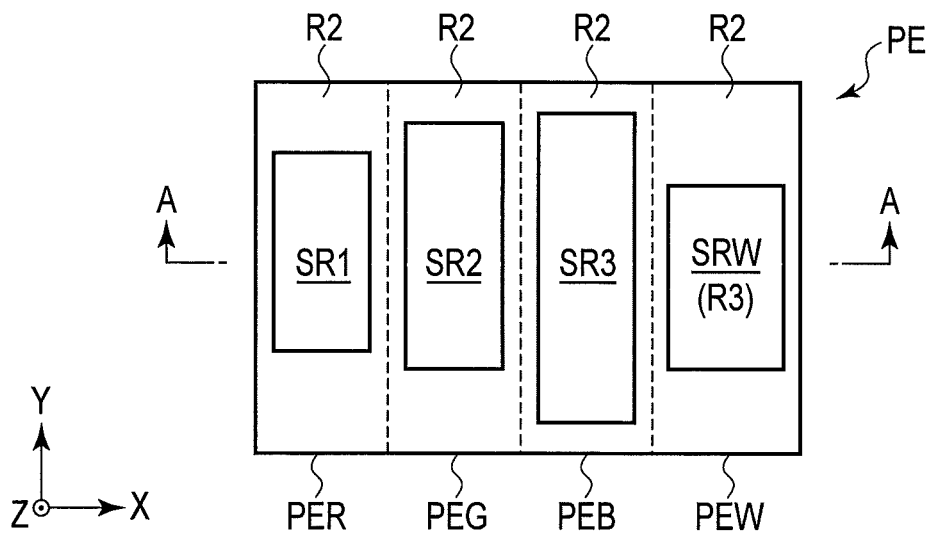
FIG. 16 is a plan view showing an example of a pixel forming the display member shown in FIG. 15.
Figure 17:
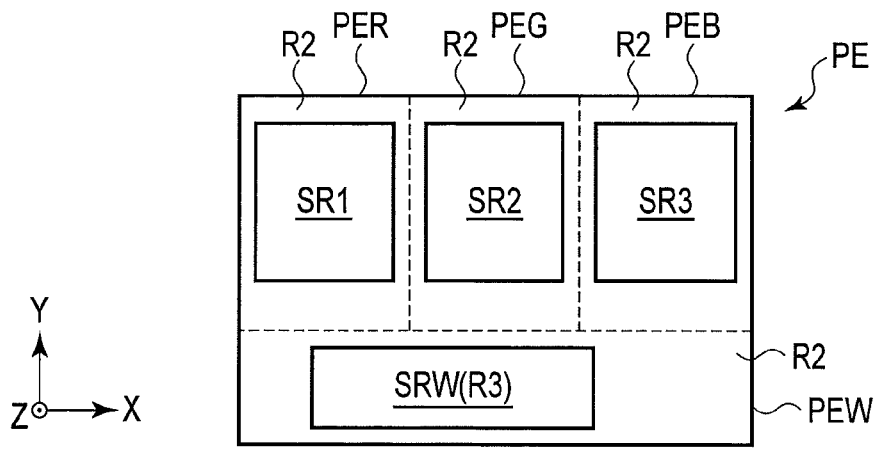
FIG. 17 is a plan view showing an example of the pixel forming the display member shown in FIG. 15.
Figure 18:
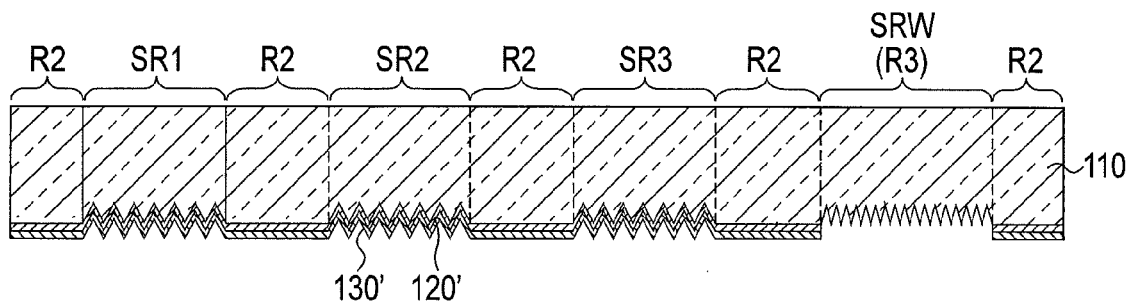
FIG. 18 is a sectional view taken along a line A-A of the pixel shown in FIG. 2.

FIGS. 16 and 17 are plan views each showing an example of the pixel forming the display member 200 according to this embodiment. FIG. 18 is a sectional view taken along a line A-A of the pixel shown in FIG. 16.

The pixel PE includes a sub region including a pixel that displays one predetermined color at least on a condition that the region is observed in an oblique direction intersecting the normal of the major surface of the display member 200 (this condition will simply be referred to as an oblique observation condition hereinafter). More specifically, for example, as shown in FIGS. 16 and 17, the pixel PE includes a red display pixel PER, green display pixel PEG, and blue display pixel PEB as sub pixels. The pixels PER, PEG, and PEB typically have the same area.

The red display pixel PER includes a first sub region SR1 and second region R2. Note that the first sub region SR1 is so formed as to display red under the oblique observation condition. That is, the first sub region SR1 includes a plurality of recesses or projections so formed as to emit diffracted light having a wavelength corresponding to red under the oblique observation condition.

The green display pixel PEG includes a second sub region SR2 and second region R2. Note that the second sub region SR2 is so formed as to display green under the oblique observation condition. That is, the second sub region SR2 includes a plurality of recesses or projections so formed as to emit diffracted light having a wavelength corresponding to green under the oblique observation condition.

The blue display pixel PEB includes a third sub region SR3 and second region R2. Note that the third sub region SR3 is so formed as to display blue under the oblique observation condition. That is, the third sub region SR3 includes a plurality of recesses or projections so formed as to emit diffracted light having a wavelength corresponding to blue under the oblique observation condition.

Note that in the following explanation, regions including the first, second, and third sub regions SR1, SR2, and SR3 will be referred to as first regions for convenience. Also, a region including a light-transmitting region SRW will be referred to as a third region for convenience.

As shown in FIG. 18, the pixel PE includes a relief structure formation layer 110, first layer 120', and second layer 130'.

A relief structure is formed on one major surface of the relief structure formation layer 110. The first layer 120' partially covers this major surface of the relief structure formation layer 110. The second layer 130' covers the first layer 120'. Note that the structure and the like of the pixel PE will be explained in detail later.

Next, a method of manufacturing (the pixel PE forming) the display member 200 will be explained with reference to FIGS. 19, 20, 21, and 22.

Figure 19:
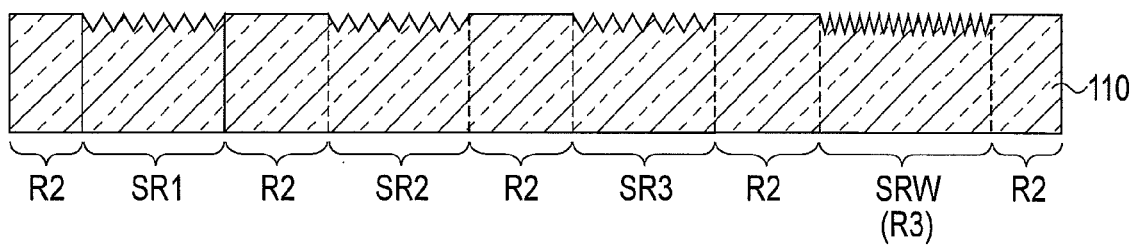
FIG. 19 is a sectional view schematically showing a method of manufacturing a display member 200.

FIGS. 19, 20, 21, and 22 are sectional views schematically showing the method of manufacturing the display member 200. First, as shown in FIG. 19, a relief structure formation layer 110 having a major surface including first regions (first, second, and third sub regions SR1, SR2, and SR3), second regions R2, and third region R3 (SRW) adjacent to each other is prepared.

A recessed structure and/or projecting structure is formed in each of the first, second, and third sub regions SR1, SR2, and SR3. The recessed structure includes a plurality of recesses, and the projecting structure includes a plurality of projections. These recesses or projections are arranged into, e.g., stripes. These recesses or projections typically form a diffraction grating or hologram that emits diffracted light when illuminated with white light.

The shape of a section perpendicular to the longitudinal direction of the plurality of recesses or projections is a tapered shape such as a V-shape or U-shape, or a rectangular shape. As an example, FIG. 19 shows a V-shape as the above-mentioned sectional shape.

The center-to-center distance of the recesses or projections in the sub region can properly be set within the range of 500 to 1,000 nm in accordance with the desired color of diffracted light.

More specifically, for example, the center-to-center distance of the plurality of recesses or projections formed in the first sub region SR1 is 860 to 880 nm. The center-to-center distance of the plurality of recesses or projections formed in the second sub region SR2 is 755 to 775 nm. The center-to-center distance of the plurality of recesses or projections formed in the third sub region SR3 is 735 to 755 nm.

Also, the average value of the ratios of the depths or heights to the center-to-center distance of the plurality of recesses or projections is, e.g., 0.5 or less, and is typically 0.05 to 0.3.

Note that the "center-to-center distance" herein mentioned means the distance between adjacent recesses or the distance between adjacent projections.

The second region R2 is a flattened structure with no recessed structure and/or projecting structure.

The recessed structure and/or projecting structure is formed in the third region R3. The recessed structure includes a plurality of recesses, and the projecting structure includes a plurality of projections. The plurality of recesses or projections include a plurality of two-dimensionally arranged recesses or projections each having a forward tapered shape.

The ratio of the surface area to the apparent area in the third region R3 is higher than that in the first regions R1. Note that the "apparent area" of a region means the area of the orthographic projection of the region to a plane parallel to the region, i.e., the area of the region when a recessed structure and projecting structure are ignored. Also, the "surface area" of a region means the area of the region when a recessed structure and projecting structure are taken into consideration.

The average value of the ratios of the depths or heights to the center-to-center distance of the plurality of recesses or projections in the third region R3 is typically larger than that of the plurality of recesses or projections in the first regions. In the example shown in FIG. 5, the ratio of the depth or height to the center-to-center distance of the plurality of recesses or projections formed in the third region R3 is higher than those of the plurality of recesses or projections formed in the first, second, and third sub regions SR1, SR2, and SR3.

The center-to-center distance of the recesses or projections formed in the third region R3 is 100 to 500 nm.

Also, the average value of the ratios of the depths or heights to the center-to-center distance of the plurality of recesses or projections formed in the third region R3 is made larger than the average value of the ratios of the depths or heights to the center-to-center distance of the plurality of recesses or projections formed in the first regions. The average value of the ratios of the depths or heights to the center-to-center distance of the plurality of recesses or projections formed in the third region R3 is, e.g., 0.8 to 2.0, and is typically 0.8 to 1.2. If this value is excessively large, the productivity of the relief structure formation layer 110 sometimes decreases.

The relief structure formation layer 110 can be formed by, e.g., pressing a metal mold having micro projections against a resin. In this case, these projections have shapes corresponding to the shapes of recesses to be formed in both the first regions and third region R3.

For example, the relief structure formation layer 110 is formed by a method of coating a substrate with a thermoplastic resin, and pressing an original plate having the above-mentioned projections against the resin while applying heat. In this method, for example, an acrylic-based resin, an epoxy-based resin, a cellulose-based resin, a vinyl-based resin, or a mixture or copolymer thereof is used as the above-mentioned thermoplastic resin.

The relief structure formation layer 110 may also be formed by a method of coating a substrate with a thermosetting resin, applying heat while pressing an original plate having the above-mentioned projections against the resin, and removing the original plate after that. In this method, for example, a urethane resin, a melamine-based resin, an epoxy resin, a phenol-based resin, or a mixture or copolymer thereof is used as the thermosetting resin. Note that the urethane resin is obtained by, e.g., adding polyisocyanate as a crosslinking agent to, e.g., acryl polyol and polyester polyol having a reactive hydroxyl group, and crosslinking the acryl polyol and polyester polyol.

Alternatively, the relief structure formation layer 110 may be formed by a method of coating a substrate with a radiation-curing resin, curing the material by irradiating it with radiation such as ultraviolet rays while pressing an original plate against the material, and removing the original plate after that. It is also possible to form the relief structure formation layer 110 by a method of supplying the above-mentioned composition between a substrate and original plate, curing the above-mentioned material by irradiating it with radiation, and removing the original plate after that.

The radiation-curing resin typically contains a polymerizable compound and initiator.

As the polymerizable compound, for example, a compound capable of radical photopolymerization is used. As the compound capable of radical photopolymerization, for example, a monomer, oligomer, or polymer having an ethylenic unsaturated bond or ethylenic unsaturated group is used. As the compound capable of radical photopolymerization, it is also possible to use, e.g., monomers such as 1,6-hexanediol, neopentyl glycol diacrylate, trimethylol propane triacrylate, pentaerythritol triacrylate, pentaerythritol tetraacrylate, pentaerythritol pentaacrylate, and dipentaerythritol hexaacrylate, oligomers such as epoxy acrylate, urethane acrylate, and polyester acrylate, or polymers such as urethane-modified acrylic resin and epoxy-modified acrylic resin.

When using the compound capable of radical photopolymerization as the polymerizable compound, a radical photopolymerization initiator is used as the initiator. As this radical photopolymerization initiator, for example, benzoin-based compounds such as benzoin, benzoinmethylether, and benzomethylether, anthraquinone-based compounds such as anthraquinone and methyl anthraquinone, phenyl ketone-based compounds such as acetophenone, diethoxy acetophenone, benzophenone, hydroxy acetophenone, 1-hydroxy cyclohexyl phenyl ketone, α-amino acetophenone, and 2-methyl-1-(4-methylthiophenyl)-2-morpholinopropane-1-on, benzyl dimethyl ketal, thioxanthone, acylphosphine oxide, or Michler's ketone is used.

Alternatively, a compound capable of cationic photopolymerization may be used as the polymerizable compound. As the compound capable of cationic photopolymerization, for example, a monomer, oligomer, or polymer including an epoxy group, a compound containing an oxetane skeleton, or vinyl ethers are used.

When using the compound capable of cationic photopolymerization as the polymerizable compound, a cationic photopolymerization initiator is used as the initiator. As this cationic photopolymerization initiator, for example, an aromatic diazonium salt, aromatic iodonium salt, aromatic sulfonium salt, aromatic phosphonium salt, or mixed ligand metal salt is used.

Alternatively, a mixture of the compound capable of radical photopolymerization and the compound capable of cationic photopolymerization may also be used as the polymerizable compound. In this case, for example, a mixture of the radical photopolymerization initiator and cationic photopolymerization initiator is used as the initiator. It is also possible to use a polymerization initiator capable of functioning as an initiator for both radical photopolymerization and cationic photopolymerization. As an initiator like this, for example, an aromatic iodonium salt or aromatic sulfonium salt is used.

Note that the ratio of the initiator in the radiation-curing resin is, e.g., 0.1 to 15 mass %.

The radiation-curing resin may further contain a sensitizing dye, a dyestuff, a pigment, a polymerization inhibitor, a leveling agent, an antifoaming agent, an antisagging agent, an adhesion increasing agent, a coated surface modifier, a plasticizer, a nitrogen-containing compound, a crosslinking agent such as an epoxy resin, a release agent, or a combination thereof. To improve the formability of the radiation-curing resin, the resin can further contain a nonreactive resin. As this nonreactive resin, it is possible to use, e.g., the above-mentioned thermoplastic resin and/or thermosetting resin.

The above-mentioned original plate used in the formation of the relief structure formation layer 110 can be manufactured by using, e.g., an electron beam lithography apparatus or nanoimprinting apparatus. In this case, the plurality of recesses or projections described above can be formed with high accuracy. Note that a general approach is to manufacture an inverted plate by transferring the recess-and-projection structure of the original plate, and manufacture a duplicated plate by transferring the recess-and-projection structure of this inverted plate. If necessary, an inverted plate is manufactured by using the duplicated plate as an original plate, and a duplicated plate is further manufactured by transferring the recess-and-projection structure of this inverted plate. In the actual manufacture, the duplicated plate thus obtained is normally used.

The relief structure formation layer 110 typically includes a substrate and a resin layer formed on it. A film substrate is typically used as the substrate. As this film substrate, plastic films such as a polyethyleneterephthalate (PET) film, polyethylenenaphthalate (PEN) film, and polypropyrene (PP) film are used. It is also possible to use paper, synthetic paper, plastic multilayered paper, or resin-impregnated paper as the substrate. Note that the substrate may also be omitted.

The resin layer is formed by, e.g., the above-described method. The thickness of the resin layer is, e.g., 0.1 to 10 μm. If this thickness is excessively large, resin protrusion and/or wrinkle formation readily occurs due to, e.g., pressurization during processing. If this thickness is excessively small, the desired recessed structure and/or projecting structure becomes difficult to form in some cases. Also, the thickness of the resin layer is made equal to or larger than the depth of height of recesses or projections to be formed on the major surface of the layer. This thickness is, e.g., 1 to 10 times, and typically, 3 to 5 times the depth or height of the recesses or projections.

Note that the relief structure formation layer 110 may also be formed by using, e.g., a "press method" disclosed in Japanese Patent No. 4194073, a "casting method" disclosed in Japanese Utility Model Registration No. 2524092, or a "photopolymer method" disclosed in Jpn. Pat. Appln. KOKAI Publication No. 2007-118563.

Figure 20:
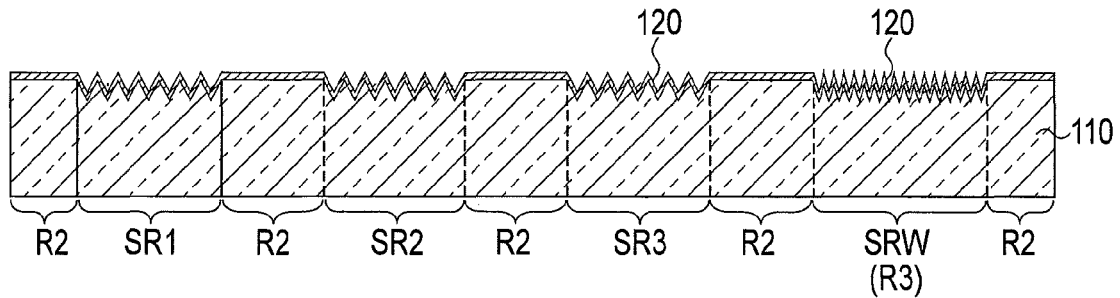
FIG. 20 is a sectional view schematically showing the method of manufacturing the display member 200.

Then, as shown in FIG. 20, a first material having a refractive index different from that of the material of the relief structure formation layer 110 is formed by vapor-phase deposition all over the first regions, second regions R2 and third region R3. Consequently, a reflective material layer 120 is formed on the major surface including the first, second, and third sub regions SR1, SR2, and SR3, the second regions R2, and the third region R3 of the relief structure formation layer 110.

As this first material, for example, a material having a refractive index different from that of the material of the relief structure formation layer 110 is used. More specifically, any material capable of reflecting light in the interface with the relief structure formation layer 110 can be used, and a metal material is used. Also, a material by which the difference between the real parts of the refractive indices is 0.2 or more is used. If this difference is small, reflection sometimes hardly occurs in the interface between the relief structure formation layer 110 and a first layer 120 (to be described later).

As the first material, at least one metal material selected from the group consisting of Al, Sn, Cr, Ni, Cu, Au, Ag, and alloys thereof is typically used.

Alternatively, as the first material having a relatively high transparency, ceramic materials or organic polymer materials to be enumerated below may also be used. Note that a numerical value in the parentheses described after each formula or compound name below means the refractive index of the material.

That is, as the ceramic material, it is possible to use, e.g., $Sb_2O_3$ (3.0), $Fe_2O_3$ (2.7), $TiO_2$ (2.6), CdS (2.6), $CeO_2$ (2.3), ZnS (2.3), $PbCl_2$ (2.3), CdO (2.2), $WO_3$ (2.2), $SiO_2$ (1.45), $Si_2O_3$ (2.5), $In_2O_3$ (2.0), PbO (2.6), $Ta_2O_3$ (2.4), ZnO (2.1), $ZrO_2$ (2.4), MgO (1.72), $MgF_2$ (1.37), or $Al_2O_3$ (1.6-1.8).

As the organic polymer material, it is possible to use, e.g., polyethylene (1.51), polypropyrene (1.49), polytetrafluoroethylene (1.35), polymethylmethacrylate (1.49), or polystyrene (1.60).

The vapor-phase deposition of the first material is performed by using, e.g., vacuum vapor deposition, sputtering, or chemical vapor deposition (CVD).

This vapor-phase deposition is performed at a uniform density in an in-plane direction parallel to the major surface of the relief structure formation layer 110. More specifically, this vapor-phase deposition is performed such that the ratio of the amount of first material in the positions of the first regions (the first, second, and third sub regions SR1, SR2, and SR3) to the apparent area of the first regions is equal to the ratio of the amount of first material in the position of the third region R3 to the apparent area of the third region R3.

Also, in this vapor-phase deposition, a film thickness (to be referred to as a set film thickness hereinafter) when it is assumed that the major surface of the relief structure formation layer 110 is entirely a flat surface is typically determined as follows. That is, this set film thickness is determined so that the reflective material layer 120 satisfies the following necessary conditions.

First, those portions of the reflective material layer 120, which correspond to the first regions, have surface shapes corresponding to the surface shapes of the first regions. In the example shown in FIG. 20, these portions form a continuous film having surface shapes corresponding to the plurality of recesses or projections formed in the first, second, and third sub regions SR1, SR2, and SR3.

Second, those portions of the reflective material layer 120, which correspond to the second regions R2, have a surface shape corresponding to the surface shape of the flat second regions R2.

Third, the portion of the reflective material layer 120, which corresponds to the third region R3, has a surface shape corresponding to the surface shape of the third region R3, or partially has openings corresponding to the arrangement of the plurality of recesses or projections formed in the third region R3. FIG. 20 shows the former case as an example. That is, in the example shown in FIG. 20, the portion forms a continuous film having a surface shape corresponding to the plurality of recesses or projections formed in the third region R3.

Note that as described previously, the ratio of the surface area to the apparent area in the third region R3 is higher than that in the first regions. Therefore, when the above-mentioned set film thickness is determined so that the reflective material layer 120 has the surface shapes corresponding to the surface shapes of the first, second, and third sub regions SR1, SR2, and SR3 and the third region R3, the portion of the reflective material layer 120, which corresponds to the third region R3, has an average film thickness smaller than that of the portions corresponding to the first, second, and third sub regions SR1, SR2, and SR3.

Note that the "average film thickness" of a layer means the average value of the distances between points on one surface of the layer and the foot of a line perpendicular to the other surface of the layer.

Also, when the above-mentioned set film thickness is determined as a smaller value, it is possible to form the reflective material layer 120 having the surface shapes corresponding to the surface shapes of the first regions in the portions corresponding to the first regions, and partially having the openings corresponding to the arrangement of the plurality of recesses or projections in the portion corresponding to the third region R3.

The set film thickness of the reflective material layer 120 is typically made smaller than the depth or height of the plurality of recesses or projections formed in the third region R3. Also, this set film thickness is typically made smaller than the depth or height of the plurality of recesses or projections formed in the first regions (the first, second, and third sub regions SR1, SR2, and SR3).

More specifically, the set film thickness of the reflective material layer 120 is, e.g., 5 to 500 nm, and is typically 30 to 300 nm. If this set film thickness is excessively small, reflection sometimes hardly occurs in the interface between the relief structure formation layer 110 and a first layer 120 (to be described later). If this set film thickness is excessively large, it sometimes becomes difficult to form the reflective material layer 120 so as to satisfy the above-mentioned necessary conditions.

The average film thickness of those portions of the reflective material layer 120, which correspond to the first regions and the first regions R2, is, e.g., 5 to 500 nm, and is typically 30 to 300 nm. If this average film thickness is excessively small, reflection sometimes hardly occurs in the interface between the relief structure formation layer 110 and a first layer 120 (to be described later). If this average film thickness is excessively large, the productivity of the display member 100 decreases in some cases.

Figure 21:
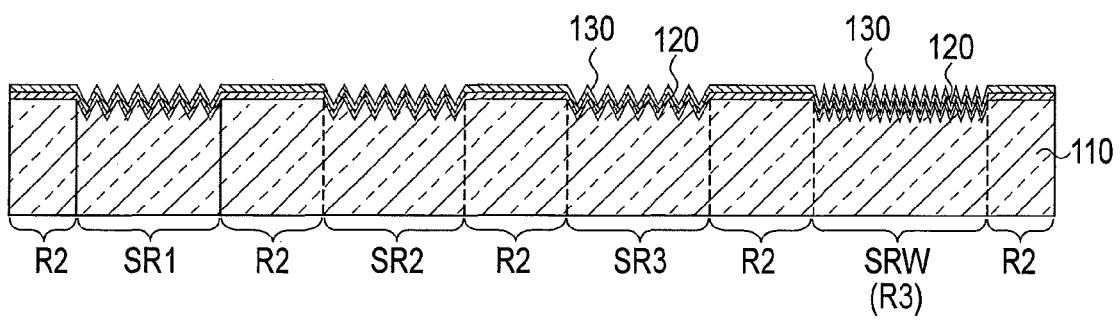
FIG. 21 is a sectional view schematically showing the method of manufacturing the display member 200.

Subsequently, as shown in FIG. 21, a second material different from the material of the reflective material layer 120 is deposited on the reflective material layer 120 in a vapor phase. Consequently, the second layer 130 as a mask layer facing the relief structure formation layer 110 with the reflective material layer 120 being sandwiched between them is formed.

An inorganic material is typically used as this second material. Examples of this inorganic material are MgF2, Sn, Cr, ZnS, ZnO, Ni, Cu, Au, Ag, TiO2, MgO, SiO2, and Al2O3. Especially when using $MgF_2$ as the second material, it is possible to further improve the followability and scratch resistance of the second layer (mask layer) 130 against the bend of the substrate and a shock.

An organic material may also be used as the second material. As this organic material, for example, an organic material having a weight-average molecular weight of 1,500 or less is used. As an organic material like this, it is also possible to use, e.g., a material obtained by mixing a polymerizable compound such as an acrylate, urethane acrylate, or epoxy acrylate and an initiator, depositing the mixture and a radiation-curing resin in a vapor phase, and polymerizing the material by irradiating it with radiation.

A metal alkoxide may also be used as the second material. Alternatively, it is also possible to use a material obtained by depositing a metal alkoxide in a vapor phase as the second material, and polymerizing the deposited material. In this process, drying may also be performed after the vapor-phase deposition and before the polymerization.

The vapor-phase deposition of the second material is performed by using, e.g., vacuum vapor deposition, sputtering, or CVD.

This vapor-phase deposition is performed at a uniform density in an in-plane direction parallel to the major surface of the relief structure formation layer 110. More specifically, this vapor-phase deposition is performed such that the ratio of the amount of second material at the positions of the first regions (the first, second, and third sub regions SR1, SR2, and SR3) to the apparent area of the first regions is equal to the ratio of the amount of second material at the position of the third region R3 to the apparent area of the third region R3.

Also, in this vapor-phase deposition, the set film thickness of the mask layer 130 is determined as follows. That is, this set film thickness is so determined that the mask layer 130 satisfies the following necessary conditions.

First, those portions of the mask layer 130, which correspond to the first regions, have surface shapes corresponding to the surface shapes of the first regions. In the example shown in FIG. 21, these portions form a continuous film having surface shapes corresponding to the plurality of recesses and projections formed in the first, second, and third sub regions SR1, SR2, and SR3.

Second, those portions of the mask layer 130, which correspond to the second region R2, have a surface shape corresponding to the surface shape of the flat second regions R2.

Third, the portion of the mask layer 130, which corresponds to the third region R3, has a surface shape corresponding to the surface shape of the third region R3, or partially has openings corresponding to the arrangement of the plurality of recesses or projections formed in the third region R3. FIG. 21 shows the latter case as an example. That is, in the example shown in FIG. 21, the portion forms, on the reflective material layer 120, a discontinuous film partially having the openings corresponding to the arrangement of the plurality of recesses or projections formed in the third region R3.

Note that as described previously, the ratio of the surface area to the apparent area in the third region R3 is higher than that in the first regions (the first, second, and third sub regions SR1, SR2, and SR3). Therefore, when the above-mentioned set film thickness is determined so that the mask layer 130 has the surface shapes corresponding to the surface shapes of the first, second, and third sub regions SR1, SR2, and SR3 and the third region R3, the portion of the mask layer 130, which corresponds to the third region R3, has an average film thickness smaller than that of the portions corresponding to the first region (the first, second, and third sub regions SR1, SR2, and SR3).

Also, when the above-mentioned set film thickness is determined as a smaller value, it is possible to form the mask layer 130 having the surface shapes corresponding to the surface shapes of the first regions in the portions corresponding to the first regions, and partially having the openings corresponding to the arrangement of the plurality of recesses or projections in the portion corresponding to the third region R3.

The set film thickness of the mask layer 130 is typically made smaller than the depth or height of the plurality of recesses or projections formed in the third region R3. Also, this set film thickness is typically made smaller than the depth or height of the plurality of recesses or projections formed in the first regions (the first, second, and third sub regions SR1, SR2, and SR3). In addition, the set film thickness of the mask layer 130 is typically made smaller than that of the reflective material layer 120.

More specifically, the set film thickness of the mask layer 130 is, e.g., 0.3 to 200 nm, and is typically 3 to 80 nm. If this set film thickness is excessively small, the average film thickness of those portions of the mask layer 130, which correspond to the first regions (the first, second, and third sub regions SR1, SR2, and SR3) becomes excessively small, and the protection for those portions of the reflective material layer 120, which correspond to the first regions, by the mask layer 130 sometimes becomes insufficient. If this set film thickness is excessively large, the protection for the portion of the reflective material layer 120, which corresponds to the third region R3, by the mask layer 130 sometimes becomes excessive.

The average film thickness of those portions of the mask layer 130, which correspond to the first regions (the first, second, and third regions SR1, SR2, and SR3), is typically made smaller than that of those portions of the reflective material layer 120, which correspond to the first regions.

The average film thickness of those portions of the mask layer 130, which correspond to the first regions and the second regions R2, is, e.g., 0.3 to 200 nm, and is typically 3 to 80 nm. If this average film thickness is excessively small, the protection for those portions of the reflective material layer 120, which correspond to the first regions, by the mask layer 130 becomes insufficient, and the average film thickness of those portions of a first layer 120 (to be described later), which correspond to the first regions, sometimes becomes excessively small. If this set film thickness is excessively large, the protection for those portions of the reflective material layer 120, which correspond to the second regions R2, by the mask layer 130 sometimes becomes excessive.

Subsequently, the mask layer 130 is exposed to a reactive gas or solution capable of reacting with the material of the reflective material layer 120. This reaction with the material of the reflective material layer 120 is caused in at least the position of the third region R3.

In this embodiment, a case of using an etching solution capable of dissolving the material of the reflective material layer 120 as the reactive gas or solution will be explained.

As this etching solution, alkaline solutions such as a sodium hydroxide solution, sodium carbonate solution, and potassium hydroxide solution are used. It is also possible to use acidic solutions such as hydrochloric acid, nitric acid, sulfuric acid, and acetic acid as the etching solution.

As shown in FIG. 21, those portions of the mask layer 130, which correspond to the first regions (the first, second, and third sub regions SR1, SR2, and SR3) and the first regions R2, form a continuous film, whereas the portion corresponding to the third region R3 forms a discontinuous film partially having openings. The portions of the reflective material layer 120, which are uncovered with the mask layer 130, come in contact with the reactive gas or solution more easily than those portions of the reflective material layer 120, which are covered with the mask layer 130. Accordingly, the former is etched more easily than the latter.

Also, when the portions of the reflective material layer 120, which are uncovered with the mask layer 130, are removed, openings corresponding to the openings in the mask layer 130 are formed in the reflective material layer 120. When etching is further continued, the etching of the reflective material layer 120 progresses in the in-plane direction in the position of each opening. As a result, on the third region R3, the portion of the reflective material layer 120, which supports the mask layer 130, is removed together with the mask layer 130 as an upper layer.

Figure 22:
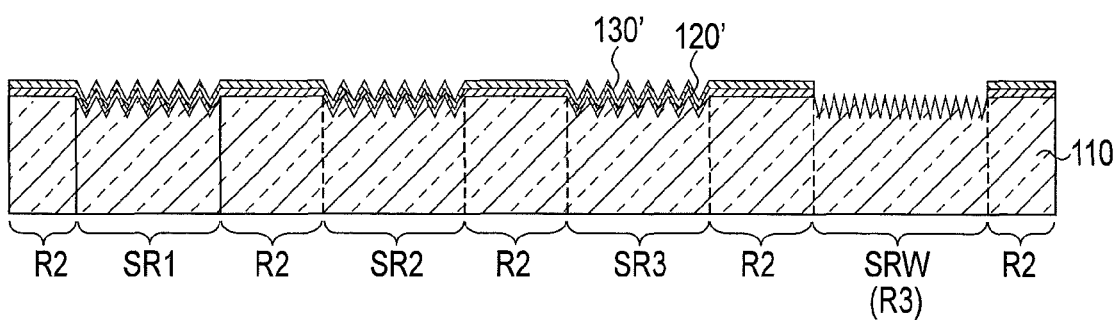
FIG. 22 is a sectional view schematically showing the method of manufacturing the display member 200.

As shown in FIG. 22, therefore, only the portion of the reflective material layer 120, which corresponds to the third region R3, can be removed by adjusting, e.g., the concentration and temperature of the etching solution and the processing time of etching. Consequently, a first layer 120' covering only the first, second, and third sub regions SR1, SR2, and SR3, and the second regions R2 is obtained.

The display member 200 including the pixels PE shown in FIGS. 16, 17, and 18 is obtained as described above. The display member 200 obtained by the above-described method has the following features.

The first layer 120' is a reflection layer and is typically made of the first material described earlier. Of the first regions (the first, second, and third sub regions SR1, SR2, and SR3) and the second regions R2 and the third region R3, the first layer 120' covers only the first regions and the second regions. That is, the first layer 120' is formed in only positions corresponding to the first regions and the second regions. Also, the ratio of the amount of first material in the position of the third region R3 to the apparent area of the third region R3 is zero.

The first layer 120' has surface shapes corresponding to the surface shapes of the first regions and the second regions. In the example shown in FIGS. 16, 17, and 18, the first layer 120' has surface shapes corresponding to the plurality of recesses and projections formed in the first, second, and third sub regions SR1, SR2, and SR3, and surface shapes corresponding to the flat second regions R2. The plurality of recesses or projections formed in the first, second, and third sub regions SR1, SR2, and SR3 typically form a diffraction grating or hologram that emits diffracted light when illuminated with white light on the surface of the first layer 120'. In this case, the display member 200 can display colors corresponding to diffracted light components emitted in the first, second, and third sub regions SR1, SR2, and SR3.

More specifically, the above-mentioned first sub region SR1 is so formed as to emit diffracted light having a wavelength corresponding to red under the oblique observation condition. The second sub region SR2 is so formed as to emit diffracted light having a wavelength corresponding to green under the oblique observation condition. The third sub region SR3 is so formed as to emit diffracted light having a wavelength corresponding to blue under the oblique observation condition. That is, on the condition that the display member 200 is obliquely observed, the display member 200 according to this embodiment displays an image (full-color positive image) based on the distribution of the first, second, and third sub regions SR1, SR2, and SR3 (i.e., the first regions). In this case, therefore, it is possible to achieve a higher forgery preventing effect and higher decorative effect.

The orthographically projected contours of the first layer 120' to the major surface of the relief structure formation layer 110 entirely overlap the contours of the first regions (the first, second, and third sub regions SR1, SR2, and SR3). That is, the first layer 120' is patterned in accordance with the shapes of the first regions. Accordingly, the first layer 120' formed with a high positional accuracy can be obtained by forming the first regions, the second regions R2, and the third region R3 with a high positional accuracy.

Note that in the method explained with reference to FIGS. 19, 20, 21, and 22, those portions of the reflective material layer 120, which correspond to the first regions (first, second, and third sub regions SR1, SR2, and SR3) and the second regions, are covered with the mask layer 130. Even when the above-mentioned etching process is performed, therefore, the film thickness of these portions hardly reduces or does not reduce at all. That is, this average film thickness is, e.g., 5 to 500 nm, and is typically 30 to 300 nm.

Note that the maximum value of the shortest distances between the contours of the first layer 120' and the boundaries between the first, second, and third sub regions SR1, SR2, and SR3 and the second regions R2 is, e.g., less than 20 μm, preferably less than 10 μm, and more preferably less than 3 μm.

The second layer 130' is formed by, e.g., vapor-phase deposition. The second layer 130' covers the first layer 120'. Of the first regions (the first, second, and third sub regions SR1, SR2, and SR3), the second regions R2, and the third region R3, the second layer 130' faces only all of the first regions and the second regions with the first layer 120' being sandwiched between them. That is, the orthographic projection of the contours of the first layer 120' to the major surface of the relief structure formation layer 110 entirely overlaps the orthographic projection of the contours of the second layer 130' to the above-mentioned major surface. Also, the ratio of the amount of second material in the position of the third region R3 to the apparent area of the third region R3 is zero.

The average film thickness of those portions of the second layer 130', which correspond to the first regions and the second regions, is equal to or smaller than that of those portions of the mask layer 130, which correspond to the first regions and the second regions. This average film thickness is, e.g., 0.3 to 200 nm, and is typically 3 to 80 nm.

The second layer 130' has, e.g., a function of protecting the first layer 120'. In addition, the formation of the second layer 130' can make the forgery of the display member 200 more difficult than when no second layer 130' exists.

In the display member 200 according to this embodiment as described above, the reflection layer is removed by etching the third region R3. That is, on the condition that the display member 200 is observed with transmitted light, portions having the reflection layer and portions from which the reflection layer is removed display a watermark picture. Also, the third region R3 for displaying the watermark picture can be so formed as to display an image different from that of the first regions for displaying a full-color image. Therefore, it is possible to obtain a display member capable of displaying different images, i.e., the full-color image obtained by diffracted light and the watermark picture obtained by watermark. This can achieve a higher forgery preventing effect.

As a more practical example, the pixel PE shown in each of FIGS. 16 and 17 includes, as sub pixels, a red display pixel PER including SR1 for displaying red diffracted light, a green display pixel PEG including SR2 for displaying green diffracted light, a blue display pixel PEB including SR1 for displaying blue diffracted light, and a watermark display pixel PEW including a light-transmitting region SRW (R2). That is, the ratios of SR1, SR2, and SR3 in one pixel PE determine the color of the diffracted light of the pixel, and the ratio of SRW determines the amount of transmitted light of the pixel.

The sub regions SR1, SR2, SR3, and SRW of the sub pixels of the pixel PE can be so formed as to have respective arbitrary areas, and some or all of these regions may also be omitted.

Figure 23:
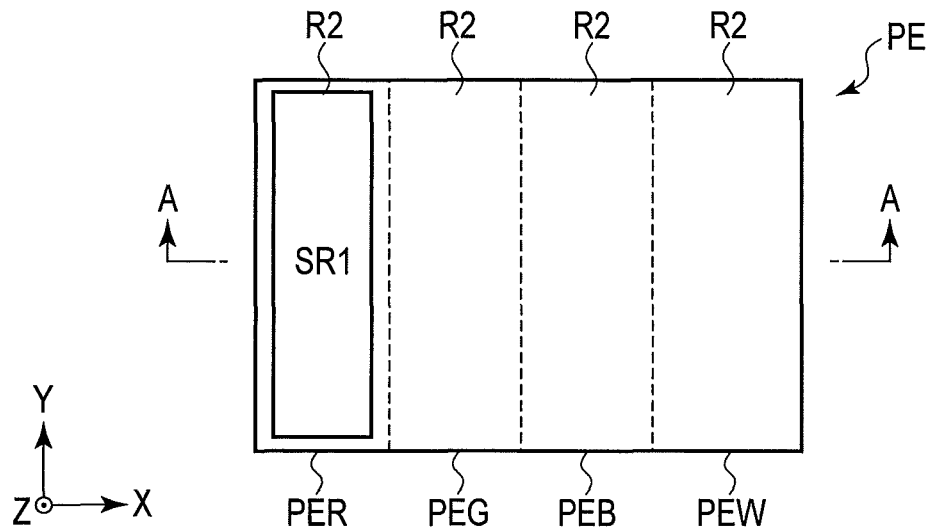
FIG. 23 is a plan view showing another example of the pixel forming the display member shown in FIG. 15.
Figure 24:
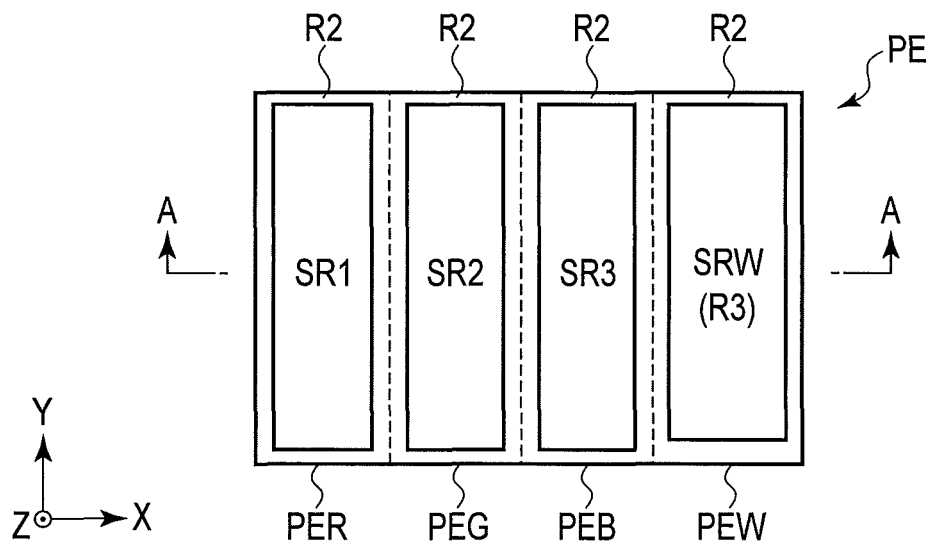
FIG. 24 is a plan view showing another example of the pixel forming the display member shown in FIG. 15.

For example, as shown in FIG. 23, when SR1 is formed in the red display pixel PER and only R2 is formed in each of the green display pixel PEG, blue display pixel PEB, and light-transmitting region SRW, this pixel displays red diffracted light and transmits no light under the oblique observation condition. In an example shown in FIG. 24, SR1, SR2, and SR3 having almost equal areas are respectively formed on the entire surfaces of the red display pixel PER, green display pixel PEG, and blue display pixel PEB, and the light-transmitting region SRW is formed on the entire surface of the watermark display pixel PEW. Under the oblique observation condition, this pixel displays white diffracted light having a maximum luminance, and transmits a relatively large amount of light.

In a display shown in, e.g., FIG. 25, therefore, since SR1, SR2, and SR3 can be controlled independently of SRW, it is possible to display different images as an image obtained by diffracted light shown in FIG. 26 and a watermark picture shown in FIG. 27. Note that a diffracting structure by SR1, SR2, and SR3 corresponding to the image shown in FIG. 26 is formed in the pixels PE in a portion where the image is formed, and none of SR1, SR2, and SR3 is formed in the pixels in the rest. In addition, no SRW is formed in the pixels PE in a portion where the image shown in FIG. 27 is formed, and SRW is formed in the pixels PE in the rest. When light is transmitted, therefore, an image formed by pixels that block the light can be confirmed.

Note that in the above explanation, the reflective material layer 120 has the surface shapes corresponding to the surface shapes of the first regions (the first, second, and third sub regions SR1, SR2, and SR3), the second regions R2, and the third region R3, those portions of the mask layer 130, which correspond to the first regions and the second regions, have the surface shapes corresponding to the surface shapes of the first regions, and the portion of the mask layer 130, which corresponds to the third region R3, partially has the openings corresponding to the arrangement of the plurality of recesses or projections formed in the third region R3. However, the layer arrangement is not limited to this.

For example, it is also possible to adopt an arrangement in which both the reflective material layer 120 and mask layer 130 have the surface shapes corresponding to the surface shapes of the first regions, the second regions R2, and the third region R3. In this case, as described previously, the average film thickness of the portion of each of the reflective material layer 120 and mask layer 130, which corresponds to the third region R3, is smaller than that of those portions of the layer, which correspond to the first regions.

Generally, those portions of the mask layer 130, which have a smaller average film thickness, let the reactive gas or solution permeate more easily than portions having a larger average film thickness. Also, when the reactive gas or solution reacts with the second material and the reaction product is immediately removed from the mask layer 130, openings can be formed in the mask layer 130 in only the position above the third region R2.

Accordingly, the display member 200 shown in FIGS. 16, 17, and 18 can be manufactured by adjusting, e.g., the concentration and temperature of the etching solution and the processing time of etching in this case as well.

Alternatively, it is possible to adopt an arrangement in which both the reflective material layer 120 and mask layer 130 have the surface shapes corresponding to the surface shapes of the first regions and the second regions R2 in portions corresponding to the first regions and the second regions R2, and partially have the openings corresponding to the arrangement of the plurality of recesses and projections formed in the third region R3 in the portion corresponding to the third region R3. The display member 200 shown in FIGS. 16, 17, and 18 can be manufactured by adjusting, e.g., the concentration and temperature of the etching solution and the processing time of etching in this case as well.

Furthermore, in the above explanation, those portions of the reflective material layer 120 and mask layer 130, which correspond to the third region R3, are completely removed. However, these portions may also partially remain. For example, the ratio of the amount of first material in the position of the third region R3 to the apparent area of the third region R3 may also be made higher than zero and lower than the ratio of the amount of first material in the positions of the first regions (the first, second, and third sub regions SR1, SR2, and SR3) to the apparent area of the first regions by shortening the time of the etching process. Likewise, the ratio of the amount of second material in the position of the third region R3 to the apparent area of the third region R3 may also be made higher than zero and lower than the ratio of the amount of second material in the positions of the first regions to the apparent area of the first regions.

In addition, an etching solution is used as the reactive gas or solution in the above explanation, but the reactive gas or solution is not limited to this. For example, an etching gas capable of vaporizing the material of the reflective material layer 120 may also be used as the reactive gas or solution.

Alternatively, as the reactive gas or solution, it is also possible to use a gas or solution capable of reacting with the first material and changing a portion of the reflective material layer 120 into a layer made of a material different from the first material. In this case, the portion of the reflective material layer 120, which corresponds to the third region R3, can be changed into the layer made of the material different from the first material, instead of removing the portion.

As the reactive gas or solution as described above, it is possible to use, e.g., an oxidizer capable of oxidizing the first material. As this oxidizer, it is possible to use, e.g., oxygen, ozone, halogen, halides such as chlorine dioxide, hypohalogenous acid, halogenous acid, hypohalogen acid, perhalogen acid, and salts thereof, inorganic peroxides such as hydrogen peroxide, persulfates, peroxocarbonates, peroxosulfates, and peroxophosphates, organic peroxides such as benzoyl peroxide, t-butyl hydroperoxide, cumene hydroperoxide, diisopropyl benzene hydroperoxide, performic acid, peracetic acid, and perbenzoic acid, metals or metal compounds such as cerium salt, Mn(III), Mn(IV), and Mn(VI) salts, silver salt, cuprous salt, chromium salt, cobalt salt, dichromate, chromate, permanganate, magnesium perphthalate, ferric chloride, and cupric chloride, or inorganic acids or inorganic acid salts such as nitric acid, nitrate, bromate, periodate, and iodate.

For example, when using Cu as the material of the reflective material layer 120, at least the portion of the reflective material layer 120, which corresponds to the third region R3, can be changed into a layer made of Cu oxide by causing these portions to react with the oxidizer. Alternatively, when using Al as the material of the reflective material layer 120, at least the portion of the reflective material layer 120, which corresponds to the third region R3, can be changed into a layer made of an Al oxide, such as boehmite, by causing these portions to react with the oxidizer.

As the above-mentioned reactive gas or solution, it is also possible to use a reducing agent capable of reducing the material of the reflective material layer 120. As this reducing agent, it is possible to use, e.g., hydrogen sulfide, sulfur dioxide, hydrogen fluoride, alcohol, carboxylic acid, hydrogen gas, hydrogen plasma, hydrogen chloride plasma, diethyl silane, ethyl silane, dimethyl silane, phenyl silane, silane, disilane, aminosilane, borane, diborane, aran, germane, hydrazine, ammonia, hydrazine, methyl hydrazine, 1,1-dimethyl hydrazine, 1,2-dimethyl hydrazine, t-butyl hydrazine, benzyl hydrazine, 2-hydrazino ethanol, 1-n-butyl-1-phenyl hydrazine, phenyl hydrazine, 1-naphthyl hydrazine, 4-chlorophenyl hydrazine, 1,1-diphenyl hydrazine, p-hydrazino benzenesulfonic acid, 1,2-diphenyl hydrazine, p-hydrazino benzenesulfonic acid, 1,2-diphenyl hydrazine, acetyl hydrazine, or benzoyl hydrazine.

Note that in the method explained with reference to FIGS. 19, 20, 21, and 22, the second layer 130' may also be removed after the first layer 120' is formed by the etching process or the like. This removal of the second layer 130' is effective when, e.g., the ionization of the first material based on the difference between the ionization tendencies of the first and second materials is concerned.

A structure adoptable as the plurality of recesses or projections formed in the third region R3 shown in FIGS. 16, 17, and 18 is the same as the structure shown in FIG. 9 explained in the above-described first embodiment.

That is, a plurality of two-dimensionally arranged projections each having a forward tapered shape are formed in the third region R3.

Note that the center-to-center distance of the plurality of recesses or projections formed in the third region R3 is 100 to 500 nm as described earlier. That is, in this embodiment, a cross grating having a large surface area is formed in the portion of the third region R3 (i.e., the portion to be etched), and only the metal reflection layer in this cross grating portion is removed as described previously.

Various modifications of the display member 200 are possible.

For example, FIG. 9 shows the third region R3 including the plurality of projections each having a conical shape, but the arrangement of the plurality of recesses or projections formed in the third region R3 is not limited to this.

For example, the plurality of recesses or projections formed in the third region R3 may have a quadrangular or triangular pyramidal shape. Also, the plurality of recesses or projections may have a truncated conical or pyramidal shape. Alternatively, the plurality of recesses or projections may have a structure in which a plurality of quadrangular prisms having different bottom areas are stacked in descending order of bottom area. Note that pillars such as circular cylinders or triangular prisms other than quadrangular prisms may also be stacked instead of quadrangular prisms.

Although FIG. 9 shows a structure in which the plurality of projections are arranged into the shape of a square grating, the arrangement of the plurality of recesses or projections is not limited to this. For example, the plurality of recesses or projections may also be arranged into the shape of a rectangular or triangular grating.

Furthermore, FIG. 15 shows a structure in which the plurality of pixels PE are arranged into the shape of a rectangular grating, but the arrangement of the plurality of pixels PE is not limited to this. For example, the plurality of pixels PE may also be arranged into the shape of a triangular grating.

The display member 200 explained above may also be used as a part of a self-adhesive sticker, transfer foil, or thread. Alternatively, the display member 200 may also be used as a part of a tear tape.

The transfer foil includes, e.g., a support layer supporting the display member 200 so that the display member 200 is peelable. As an example, a release layer is formed between the obverse surface of the display member 200 and the support layer, and an adhesive layer is formed on the reverse surface of the display member 200.

The support layer is, e.g., a film or sheet made of a resin. As the material of the support layer, for example, a polyethyleneterephthalate resin, polyethylenenaphthalate resin, polyimide resin, polyethylene resin, polypropyrene resin, or vinyl chloride resin is used.

The release layer has a function of facilitating the release of the support layer when transferring the transfer foil to a transfer target material. An example of the material of the release layer is a resin. The release layer may further contain additives such as paraffin wax, carnauba wax, polyethylene wax, and silicone. Note that the thickness of the release layer is, e.g., 0.5 to 5 µm.

As the material of the adhesive layer, adhesives such as a reaction curing type adhesive, volatile solvent type adhesive, hot-melt type adhesive, electron beam curing type adhesive, and heat-sensitive adhesive are used.

As the reaction curing type adhesive, for example, polyurethane-based resins such as polyester urethane, polyether urethane, and acryl urethane, or an epoxy resin is used.

As the volatile solvent type adhesive, aqueous emulsion type adhesives containing, e.g., a vinyl acetate resin, acrylic ester copolymer resin, ethylene-vinyl acetate copolymer resin, ionomer resin, and urethane resin, and latex type adhesives containing, e.g., natural rubber, a styrene-butadiene copolymer resin, and acrylonitrile-butadiene copolymer resin are used.

As the hot-melt type adhesive, adhesives containing, as base resins, an ethylene-vinyl acetate copolymer resin, ethylene-ethylacrylate copolymer resin, polyester resin, polycarbonate resin, polyvinylether resin, polyurethane resin, and the like are used.

As the electron beam curing type adhesive, for example, an adhesive mainly containing an oligomer having one or a plurality of vinyl-based functional groups such as an acryloyl group, allyl group, and vinyl group is used. For example, a mixture of polyesteracrylate, polyestermethacrylate, epoxyacrylate, epoxymethacrylate, urethaneacrylate, urethanemethacrylate, polyetheracrylate, or polyethermethacrylate and an adhesion promoter can be used as the electron beam curing type adhesive. As the adhesive promoter, for example, phosphorus-containing acrylate or its derivative or carboxy-group-containing acrylate or its derivative is used.

As the heat-sensitive adhesive, for example, a polyester resin, acrylic resin, vinyl chloride resin, polyamide resin, polyvinyl acetate resin, rubber-based resin, ethylene-vinyl acetate copolymer resin, or vinyl chloride-vinyl acetate copolymer resin is used.

The adhesive layer is obtained by, e.g., coating the reverse surface of the display member 200 with the above-described resin by using coaters such as a gravure coater, micro gravure coater, and roll coater.

The transfer foil is transferred to a transfer target material by using a roll transfer apparatus or hot stamp. In this process, release occurs from the release layer, and the display member 200 is adhered to the transfer target material via the adhesive layer.

The display member 200 according to this embodiment can also be incorporated into an article and used as an article with a display member. An example of the article with a display member is a card including a card substrate.

The substrate is made of plastic, a paper substrate, or the like. In this embodiment, however, as the display member is observed with transmitted light as well, it is favorable to use a substrate having at least partial light transmittance or whole transmittance.

A printed layer is formed on the substrate. The above-described display member 200 is fixed, via an adhesive layer or the like, on the surface of the substrate on which the printed layer is formed. The display member 200 is prepared as, e.g., a self-adhesive sticker or transfer foil, and fixed to the substrate by adhering the sticker or foil to the printed layer.

This card includes the above-described display member 200. Therefore, the card has a high forgery preventing effect. The card further includes the printed layer in addition to the display member 200. Accordingly, the optical effect of the display member 200 can be emphasized by comparing this optical effect with that of the printed layer.

The card may be a magnetic card or another card such as an IC (Integrated Circuit) card, wireless card, and ID (Identification) card.

Alternatively, the article with a display member may be a security such as a gift certificate or stock certificate other than a card. Furthermore, the article with a display member may be a tag or label to be attached to an article to be confirmed as an authentic product. Alternatively, the article with a display member may be a package containing an article to be confirmed as an authentic product or a part of the package.

The display member 200 can be adhered to the substrate. When using, e.g., paper as the substrate, however, it is possible to embed the display member 200 in the paper, and form an opening in the paper in a position corresponding to the display member 200.

Note that the display member according to this embodiment is observed with transmitted light as well, so a light-transmitting material is preferably used as the substrate. In this case, the display member 200 may be embedded in the material or fixed to the reverse surface of the substrate, i.e., the surface opposite to the display surface.

The display member 200 may also be used for a purpose other than forgery prevention. For example, the display member 200 can also be used as a toy, learning material or ornament.

Example

First, drawing data capable of displaying a desired image was formed under each of the oblique observation condition and a condition by which observation is performed using transmitted light. Note that drawing data in a watermark portion (i.e., the third region R3) was formed by a cross grating of 2,000 lines/mm. A shape corresponding to the above-mentioned data was drawn on an electron beam resist by using an electron beam. Desired recesses or projections were formed by developing this resist. After that, a conductive layer was deposited in a vapor phase, conduction to the surface of each recess or projection was obtained by nickel sputtering, and a metal mold was manufactured by nickel electroforming. A plate was manufactured as described above.

Then, a relief structure formation layer 110 made of a polyethyleneterephthalate resin was coated with a release layer made of an acrylic resin. The thickness of the release layer was 1 μm. The release layer was then coated with a layer made of a resin for molding. The thickness of this layer was 1 μm. A web was manufactured as described above.

Subsequently, the plate was pressed against the surface of the resin layer of the above-mentioned web while applying, e.g., a heat of 100° C. and a pressure of 1 MPa. Thus, a relief structure formation layer 110 including the plurality of recesses or projections on one major surface was obtained.

Note that in a portion corresponding to the first sub region SR1, the center-to-center distance of the plurality of recesses or projections was set at 870 nm. In a portion corresponding to the second sub region SR2, the center-to-center distance of the plurality of recesses or projections was set at 765 nm. In a portion corresponding to the third sub region SR3, the center-to-center distance of the plurality of recesses or projections was set at 745 nm. Also, portions corresponding to the second regions R2 were given a flat shape. In a portion corresponding to the third region R3, the center-to-center distance of the plurality of recesses or projections was set at 250 nm.

Then, aluminum was deposited on the relief structure formation layer 110. A reflective material layer 120 was thus obtained. The thickness of the reflective material layer 120 was 50 nm.

Subsequently, MgF2 was deposited on the reflective material layer 120. A mask layer 130 was thus obtained. The thickness of the mask layer 130 was 20 nm.

Etching was then performed by dipping the material in an NaOH (5%, 50° C.) solution, thereby obtaining a first layer 120' and second layer 130'.

After that, the aluminum-deposited surface was coated with a 2-μm thick adhesive made of an acrylic-based resin by gravure coating, thereby forming an adhesive layer 54. A transfer foil was obtained as described above.

Then, the display member 200 was transferred to a transfer target material by using the transfer foil. A light-transmitting transfer target sheet was used as this transfer target material. Also, the transfer was performed at a temperature of 150° C. and a pressure of 10 MPa. Thus, a sheet on which the display member 200 was adhered was obtained as an article with a display member.

This sheet was obliquely observed. Consequently, it was possible to observe a photograph-quality, full-color hologram image by diffracted light components from the first, second, and third sub regions SR1, SR2, and SR3. Subsequently, this sheet was observed with transmitted light. As a consequence, it was possible to observe a monochrome negative image based on the distribution of the third region R3.

That is, when using the display member 200, it was possible to observe the full-color hologram image under the oblique observation condition, and observe the monochrome negative image under the transmitted-light observation condition. This made it possible to achieve a higher forgery preventing effect.

Note that in the display members according to the above-described first and second embodiments, it is also possible to have an arrangement which further forms another pattern on the same surface. More specifically, a diffraction grating pattern including relief type diffraction gratings can further be formed. This diffraction grating pattern is a structure that generates a diffracted wave when irradiated with illumination light.

It is also possible to further form a pattern (to be referred to as a light-scattering pattern hereinafter) that displays an image by light scattering. In this light-scattering pattern, a plurality of linear projections and/or recesses arranged in the same direction are formed in the interface between the relief structure formation layer 110 and reflective material layer 120, and a plurality of regions (to be referred to as light-scattering regions hereinafter) arranged in different directions are formed. When the plurality of regions are illuminated in the normal direction, they emit scattered light over the broadest emission range in a plane perpendicular to the longitudinal direction of the linear projections and/or recesses, and emit scattered light over the narrowest emission range in a plane parallel to the longitudinal direction of the linear projections and/or recesses and perpendicular to the major surfaces of the regions.

A visual effect obtained by the plurality of light-scattering regions will be explained below with reference to FIG. 28. FIG. 28 is a plan view schematically showing an example of the light-scattering region. A light-scattering region 300 shown in FIG. 28 includes a plurality of light-scattering structures 310. The light-scattering structures 310 are a plurality of linear projections and/or recesses arranged in the same direction in each light-scattering region 300. That is, the light-scattering structures 310 are arranged almost in parallel in each light-scattering region 300.

Note that the light-scattering structures 310 need not be arranged completely in parallel in each light-scattering region 300. As long as the light-scattering region 300 has sufficient anisotropic light-scattering ability, the longitudinal direction of some light-scattering structures 310 may intersect that of other light-scattering structures 310 in the light-scattering region 300. Of directions parallel to the major surface of the light-scattering region 300, a direction in which the light-scattering region 300 shows a minimum light-scattering ability will be called an "orientation direction" hereinafter, and a direction in which the light-scattering region 300 shows a maximum light-scattering ability will be called a "light-scattering axis" hereinafter.

In the light-scattering region 300 shown in FIG. 28, a direction indicated by an arrow 320 is the orientation direction, and a direction indicated by an arrow 330 is the light-scattering axis. For example, when the light-scattering region 300 is illuminated in an oblique direction perpendicular to the orientation direction 320 and observed from the front, the light-scattering region 300 looks relatively bright due to its high light-scattering ability. On the other hand, when the light-scattering region 300 is illuminated in an oblique direction perpendicular to the light-scattering axis 330 and observed from the front, the light-scattering region 300 looks relatively dark due to its low light-scattering ability.

As is evident from the above description, when the light-scattering region 300 is obliquely illuminated and observed from the front, for example, the brightness of the light-scattering region 300 changes when it is rotated around its normal direction. Therefore, when adopting the same structure as the above-mentioned plurality of light-scattering regions (e.g., two light-scattering regions) and making only the directions of the light-scattering axes 330 different from each other between these regions, for example, one region looks relatively dark when the other region looks brightest, and the other region looks relatively bright when one region looks darkest.

That is, when the light-scattering axes 330 of two light-scattering regions are made different from each other, a brightness difference can be produced between the two regions. This makes it possible to display an image. Especially, when the difference between the angles of the light-scattering axes 330 of two light-scattering regions is sufficient (e.g., 30° or more) or the light-scattering anisotropies of the two regions are sufficiently increased, it is possible to observe images displayed in the two regions under different observation conditions.

Note that although the explanation has been made only briefly, a pattern disclosed in Jpn. Pat. Appln. KOKAI Publication No. 2008-107472 can be used as the above-mentioned light-scattering pattern.

In addition, it is also possible to further form a pattern (to be referred to as a structural color OVD pattern hereinafter) obtained by arranging a plurality of projections having upper surfaces almost parallel to the substrate surface, or a plurality of recesses having bottom surfaces almost parallel to the substrate surface, and a flat portion almost parallel to the substrate surface. This pattern can display a color formed by light having a plurality of wavelengths in accordance with the entrance of illumination light. That is, this pattern does not change the color into rainbow colors in accordance with changes in the positions of the illumination or observer unlike a relief type diffraction grating pattern, and can achieve a visual effect different from that of a forgery preventing medium using the diffraction grating.

The printed layer of the display member is formed by ink or toner, generates a color having hue, brightness, and saturation unique to the ink or toner, and does not largely change the tone of the color in accordance with the entrance angle of illumination light or the observation angle. On the other hand, a region where the structural color OVD pattern is formed can display a unique color under normal illumination conditions, and can display a different color when the conditions change. Since these two layers having different functions are formed in the display member, it is possible to give the display member a unique visual effect that cannot be achieved by a normal printed layer alone.

Note that although the explanation has been made only briefly, a pattern disclosed in Jpn. Pat. Appln. KOKAI Publication No. 2011-218648 can be used as the above-mentioned structural OVD pattern.

Furthermore, it is also possible to further form the above-described cross grating. When using this cross grating, the display member looks black when observed in its normal direction, but emits diffracted light at a deep angle. This makes it possible to give the display member a unique visual effect by which an image normally displayed in black suddenly glitters as the observation angle changes. Note that a grating disclosed in Jpn. Pat. Appln. KOKAI Publication No. 2009-086648 can be used as the cross grating.

It is possible to achieve a higher forgery preventing effect by thus combining other patterns as mentioned above with the display members according to the above-described first and second embodiments.

What is claimed is:

1. A display member comprising:
a plurality of pixels, each of the plurality of pixels comprising:
a relief structure formation layer including a first region formed by a plurality of recesses or projections and including at least one sub region configured to display a predetermined color on a condition that the sub region is observed in an oblique direction intersecting a normal of a major surface of the display member, and a second region different from the first region;
a first layer which is made of a first material having a refractive index different from that of a material of the relief structure formation layer, and covers at least the first region, and in which a portion corresponding to the first region has a surface shape corresponding to a surface shape of the first region, and a ratio of an amount of the first material in a position of the second region to an apparent area of the second region is zero or lower than a ratio of an amount of the first material in a position of the first region to an apparent area of the first region; and
a second layer which is made of a second material different from the first material, and covers the first layer, and in which a ratio of an amount of the second material in the position of the second region to the apparent area of the second region is zero or lower than a ratio of an amount of the second material in the position of the first region to the apparent area of the first region,
wherein each of the plurality of pixels displays an arbitrary color in accordance with the respective at least one sub region, and
for each of the plurality of pixels, the display member displays a positive image based on a distribution of the first region on the condition that the display member is observed in the oblique direction, and displays a negative image based on a distribution of the second region on a condition that the display member is observed with transmitted light.

2. The display member according to claim 1, characterized in that the second region is formed by a plurality of recesses or projections having a higher ratio of a surface area to the apparent area of the second region.

3. The display member according to claim 2, characterized in that the second region is formed by a plurality of recesses or projections two-dimensionally arranged at a center-to-center distance of not more than 500 nm, and each having a forward tapered shape.

4. A transfer foil comprising the display member according to claim 3, and a support layer supporting the display member such that the display member is peelable.

5. An article with a display member, comprising the display member according to claim 3, and an article supporting the display member.

6. A transfer foil comprising the display member according to claim 2, and a support layer supporting the display member such that the display member is peelable.

7. An article with a display member, comprising the display member according to claim 2, and an article supporting the display member.

8. The display member according to claim 1, characterized in that the first region includes a first sub region configured to display red on a condition that the first sub region is observed in an oblique direction intersecting a normal of a major surface of the display member, a second sub region configured to display green under the condition, and a third sub region configured to display blue under the condition.

9. A transfer foil comprising the display member according to claim 1, and a support layer supporting the display member such that the display member is peelable.

10. An article with a display member, comprising the display member according to claim 1, and an article supporting the display member.

11. A display member including comprising:
a plurality of pixels, each of the plurality of pixels comprising:
a relief structure formation layer including a first region formed by a plurality of recesses or projections and including at least one sub region configured to display a predetermined color on a condition that the sub region is observed in an oblique direction intersecting a normal of a major surface of the display member, a flat second region, and a third region different from the first region and the second region;
a first layer which is made of a first material having a refractive index different from that of a material of the relief structure formation layer, and covers at least the first region and the second region, and in which portions corresponding to the first region and the second region have surface shapes corresponding to surface shapes of the first region and the second region, and a ratio of an amount of the first material in a position of the third region to an apparent area of the third region is zero or lower than a ratio of an amount of the first material in positions of the first region and the second region to an apparent area of the first region and the second region; and
a second layer which is made of a second material different from the first material, and covers the first layer, and in which a ratio of an amount of the second material in the position of the third region to the apparent area of the third region is zero or lower than a ratio of an amount of the second material in the position of the first region to the apparent area of the first region,
wherein each of the plurality of pixels displays an arbitrary color in accordance with the respective at least one sub region, and
for each of the plurality of pixels, the display member displays a positive image based on a distribution of the first region on the condition that the display member is observed in the oblique direction, and displays a watermark picture based on a distribution of the third region on a condition that the display member is observed with transmitted light.

12. The display member according to claim 11, characterized in that the third region is formed by a plurality of recesses or projections having a higher ratio of a surface area to the apparent area of the third region.

13. The display member according to claim 12, characterized in that the third region is formed by a plurality of recesses or projections two-dimensionally arranged at a center-to-center distance of not more than 500 nm, and each having a forward tapered shape.

14. A transfer foil comprising the display member according to claim 12, and a support layer supporting the display member such that the display member is peelable.

15. An article with a display member, comprising the display member according to claim 12, and an article supporting the display member.

16. The display member according to claim 11, characterized in that a center-to-center distance of the plurality of recesses or projections in the first region is 500 to 1,000 nm.

17. The display member according to claim 16, characterized in that the first region includes a first sub region configured to display red on a condition that the first sub region is observed in an oblique direction intersecting a normal of a major surface of the display member, a second sub region configured to display green under the condition, and a third sub region configured to display blue under the condition.

18. A transfer foil comprising the display member according to claim 11, and a support layer supporting the display member such that the display member is peelable.

19. An article with a display member, comprising the display member according to claim 11, and an article supporting the display member.

* * * * *

UNITED STATES PATENT AND TRADEMARK OFFICE
CERTIFICATE OF CORRECTION

PATENT NO. : 9,720,146 B2
APPLICATION NO. : 14/287807
DATED : August 1, 2017
INVENTOR(S) : Akira Kubo et al.

It is certified that error appears in the above-identified patent and that said Letters Patent is hereby corrected as shown below:

On the Title Page

Column 1, Item [71] (Applicant), Line 2:
Delete "Toyko" and insert -- Tokyo --, therefore.

Column 1, Item [72] (Inventors), Line 1:
Delete "Toyko" and insert -- Tokyo --, therefore.

In the Claims

Column 39, Line 10:
In Claim 11, after "member" delete "including".

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*